US010291069B2

(12) United States Patent
Koyanagi et al.

(10) Patent No.: US 10,291,069 B2
(45) Date of Patent: *May 14, 2019

(54) MOBILE TERMINAL AND CHARGEABLE COMMUNICATION MODULE

(71) Applicant: Sovereign Peak Ventures, LLC, Texas, TX (US)

(72) Inventors: Yoshio Koyanagi, Kanagawa (JP); Koichi Yamamoto, Kanagawa (JP); Takanori Hirobe, Ishikawa (JP); Hiroyuki Uejima, Ishikawa (JP); Kenichiro Tabata, Oita (JP); Shuichiro Yamaguchi, Oita (JP); Munenori Fujimura, Oita (JP); Akio Hidaka, Fukuoka (JP); Takumi Naruse, Miyazaki (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 198 days.

This patent is subject to a terminal disclaimer.

(21) Appl. No.: 15/480,174

(22) Filed: Apr. 5, 2017

(65) Prior Publication Data

US 2017/0229910 A1    Aug. 10, 2017

Related U.S. Application Data

(63) Continuation of application No. 14/410,556, filed as application No. PCT/JP2013/003317 on May 24, 2013, now Pat. No. 9,667,086.

(30) Foreign Application Priority Data

Jun. 28, 2012 (JP) .................................. 2012-145962

(51) Int. Cl.
*H01M 2/10* (2006.01)
*H02J 7/02* (2016.01)
(Continued)

(52) U.S. Cl.
CPC ............ *H02J 50/10* (2016.02); *H01F 27/245* (2013.01); *H01F 27/2804* (2013.01);
(Continued)

(58) Field of Classification Search
CPC .. H02J 7/0044; H02J 2007/0096; H02J 50/12; H02J 50/40; H02J 50/90;
(Continued)

(56) References Cited

U.S. PATENT DOCUMENTS 5,198,647 A    3/1993  Mizuta
5,313,444 A    5/1994  Ishii et al.
(Continued)

FOREIGN PATENT DOCUMENTS

CN    101681719 A    3/2010
CN    101771283 A    7/2010
(Continued)

OTHER PUBLICATIONS

Notification of Reasons for Refusal, dated Jun. 27, 2017, corresponding to Japanese Application No. 2016-252053, 6 pages.
(Continued)

*Primary Examiner* — Drew A Dunn
*Assistant Examiner* — Sailesh Thapa
(74) *Attorney, Agent, or Firm* — Seed IP Law Group LLP

(57)    ABSTRACT

A mobile terminal is provided with a housing, a circuit board included in the housing and having a thickness direction normal to a plane of the circuit board, a battery pack included in the housing, and a non-contact charging module included in the housing. The non-contact charging module includes a charging coil formed of a wound conducting wire; a communication coil arranged adjacent to the charging coil; and a magnetic sheet on which the charging coil and the communication coil are arranged. The magnetic sheet has four edges that collectively define a rectangular profile of the
(Continued)

magnetic sheet, and at most three pairs of adjacent edges respectively meet to form at most three corners. At least a portion of the non-contact charging module overlaps with the circuit board as viewed in the thickness direction of the circuit board.

16 Claims, 16 Drawing Sheets

(51) Int. Cl.
| | |
|---|---|
| H04B 5/00 | (2006.01) |
| H04M 1/02 | (2006.01) |
| H01F 27/28 | (2006.01) |
| H01F 27/36 | (2006.01) |
| H01F 38/14 | (2006.01) |
| H01M 10/46 | (2006.01) |
| H02J 50/10 | (2016.01) |
| H02J 50/12 | (2016.01) |
| H02J 50/70 | (2016.01) |
| H02J 50/90 | (2016.01) |
| H01F 27/245 | (2006.01) |

(52) U.S. Cl.
CPC ....... *H01F 27/2823* (2013.01); *H01F 27/365* (2013.01); *H01F 38/14* (2013.01); *H01M 2/1066* (2013.01); *H01M 10/46* (2013.01); *H02J 7/025* (2013.01); *H02J 50/12* (2016.02); *H02J 50/70* (2016.02); *H02J 50/90* (2016.02); *H04B 5/0037* (2013.01); *H04M 1/0262* (2013.01); *H04M 2250/04* (2013.01)

(58) Field of Classification Search
CPC .......... H02J 5/005; H02J 7/0052; H02J 7/025; H02J 7/0045; H02J 7/02
See application file for complete search history.

(56) References Cited

U.S. PATENT DOCUMENTS

| | | | |
|---|---|---|---|
| 6,040,680 A | 3/2000 | Toya et al. |
| 6,175,212 B1 | 1/2001 | Oguri |
| 6,396,241 B1 | 5/2002 | Ramos et al. |
| 6,625,481 B2 | 9/2003 | Bennett et al. |
| 6,803,744 B1 | 10/2004 | Sabo |
| 7,042,196 B2 | 5/2006 | Ka-Lai et al. |
| 7,271,596 B2 | 9/2007 | Furse et al. |
| 7,948,208 B2 | 5/2011 | Partovi et al. |
| 8,009,007 B2 | 8/2011 | Utsuno et al. |
| 8,055,310 B2 | 11/2011 | Beart et al. |
| 8,089,245 B2 | 1/2012 | Kato et al. |
| 8,188,826 B2 | 5/2012 | Okada et al. |
| 8,193,767 B2 | 6/2012 | Inoue et al. |
| 8,232,764 B2 | 7/2012 | Inoue et al. |
| 8,237,401 B2 | 8/2012 | Sip et al. |
| 8,260,199 B2 | 9/2012 | Kowalski |
| 8,269,375 B2 | 9/2012 | Sogabe et al. |
| 8,280,453 B2 | 10/2012 | Beart et al. |
| 8,283,888 B2 | 10/2012 | Inoue et al. |
| 8,362,868 B2 | 1/2013 | Tamura et al. |
| 8,421,574 B2 | 4/2013 | Suzuki et al. |
| 8,457,550 B2 | 6/2013 | Goto et al. |
| 8,541,977 B2 | 9/2013 | Hasegawa et al. |
| 8,542,018 B2 | 9/2013 | Yoshikawa |
| 8,547,058 B2 | 10/2013 | Tabata et al. |
| 8,552,684 B2 | 10/2013 | Tabata et al. |
| 8,560,024 B2 | 10/2013 | Beart et al. |
| 8,643,219 B2 | 2/2014 | Yabe et al. |
| 8,643,473 B2 | 2/2014 | Suzuki |
| 8,664,801 B2 | 3/2014 | Abe |
| 8,680,811 B2 | 3/2014 | Mochida et al. |
| 8,766,484 B2 | 7/2014 | Baarman et al. |
| 8,811,894 B2 | 8/2014 | Cordier |
| 8,829,731 B2 | 9/2014 | Baarman et al. |
| 8,847,831 B2 | 9/2014 | Kato et al. |
| 8,905,317 B1 | 12/2014 | Hsu et al. |
| 8,909,139 B2 | 12/2014 | Aldana et al. |
| 8,922,162 B2 | 12/2014 | Park et al. |
| 8,995,910 B2 | 3/2015 | Chong et al. |
| 9,048,959 B2 | 6/2015 | Voutilainen et al. |
| 9,126,514 B2 | 9/2015 | Soar |
| 9,143,041 B2 | 9/2015 | Itabashi et al. |
| 9,153,885 B2 | 10/2015 | Yamaguchi et al. |
| 9,240,702 B2 | 1/2016 | Soar |
| 9,265,957 B2 | 2/2016 | Chen et al. |
| 9,362,985 B2 | 6/2016 | Uchida et al. |
| 2005/0116683 A1 | 6/2005 | Cheng et al. |
| 2005/0151696 A1 | 7/2005 | Govari et al. |
| 2006/0076922 A1 | 4/2006 | Cheng et al. |
| 2006/0082659 A1 | 4/2006 | Koo |
| 2006/0205381 A1 | 9/2006 | Beart et al. |
| 2007/0176829 A1 | 8/2007 | Liu |
| 2007/0182367 A1 | 8/2007 | Partovi |
| 2007/0206116 A1 | 9/2007 | Chou |
| 2007/0279022 A1 | 12/2007 | Chen et al. |
| 2007/0297204 A1 | 12/2007 | Lu et al. |
| 2008/0031606 A1 | 2/2008 | Zax et al. |
| 2008/0070003 A1 | 3/2008 | Nakatani et al. |
| 2008/0111518 A1 | 5/2008 | Toya |
| 2008/0122570 A1 | 5/2008 | Takaishi |
| 2008/0164839 A1 | 7/2008 | Kato et al. |
| 2008/0164840 A1 | 7/2008 | Kato et al. |
| 2008/0164844 A1 | 7/2008 | Kato et al. |
| 2008/0165063 A1 | 7/2008 | Schlub et al. |
| 2008/0197960 A1 | 8/2008 | Hasegawa et al. |
| 2008/0297107 A1 | 12/2008 | Kato et al. |
| 2008/0297295 A1 | 12/2008 | Yamazaki et al. |
| 2008/0303735 A1 | 12/2008 | Fujimoto et al. |
| 2009/0001932 A1 | 1/2009 | Kamijo et al. |
| 2009/0015362 A1 | 1/2009 | Okada et al. |
| 2009/0021212 A1 | 1/2009 | Hasegawa et al. |
| 2009/0033280 A1 | 2/2009 | Choi et al. |
| 2009/0050624 A1 | 2/2009 | Ventura |
| 2009/0058358 A1 | 3/2009 | Inoue et al. |
| 2009/0096413 A1 | 4/2009 | Partovi et al. |
| 2009/0102419 A1 | 4/2009 | Gwon et al. |
| 2009/0121677 A1 | 5/2009 | Inoue et al. |
| 2009/0143104 A1 | 6/2009 | Loh et al. |
| 2009/0212637 A1 | 8/2009 | Baarman et al. |
| 2009/0230777 A1 | 9/2009 | Baarman et al. |
| 2009/0284341 A1 | 11/2009 | Okada et al. |
| 2010/0001683 A1 | 1/2010 | Huang |
| 2010/0001823 A1 | 1/2010 | Kawarai |
| 2010/0007215 A1 | 1/2010 | Sakuma |
| 2010/0127813 A1 | 5/2010 | Utsuno et al. |
| 2010/0156344 A1 | 6/2010 | Inoue et al. |
| 2010/0156345 A1 | 6/2010 | Phelps, III |
| 2010/0156735 A1 | 6/2010 | Nakamura et al. |
| 2010/0164431 A1 | 7/2010 | Sip et al. |
| 2010/0181842 A1 | 7/2010 | Suzuki et al. |
| 2010/0207575 A1 | 8/2010 | Pijnenburg et al. |
| 2010/0210207 A1 | 8/2010 | Goto et al. |
| 2010/0244579 A1 | 9/2010 | Sogabe et al. |
| 2010/0244839 A1 | 9/2010 | Yoshikawa |
| 2010/0264746 A1 | 10/2010 | Kazama et al. |
| 2010/0270867 A1 | 10/2010 | Abe |
| 2010/0311327 A1 | 12/2010 | Hamada |
| 2010/0320843 A1 | 12/2010 | Kitamura et al. |
| 2011/0025264 A1 | 2/2011 | Mochida et al. |
| 2011/0043050 A1 | 2/2011 | Yabe et al. |
| 2011/0050164 A1 | 3/2011 | Partovi et al. |
| 2011/0050535 A1 | 3/2011 | Yamaguchi et al. |
| 2011/0102125 A1 | 5/2011 | Tamura et al. |
| 2011/0183729 A1 | 7/2011 | Satou |
| 2011/0210619 A1 | 9/2011 | Beart et al. |
| 2011/0210696 A1 | 9/2011 | Inoue |
| 2011/0227799 A1 | 9/2011 | Hashimoto |
| 2011/0241837 A1 | 10/2011 | Suzuki |
| 2011/0267238 A1 | 11/2011 | Nekozuka |
| 2011/0309792 A1 | 12/2011 | Mochida et al. |
| 2011/0316475 A1 | 12/2011 | Jung et al. |

(56) References Cited

U.S. PATENT DOCUMENTS

| | | |
|---|---|---|
| 2012/0057322 A1 | 3/2012 | Waffenschmidt |
| 2012/0098352 A1 | 4/2012 | Takaishi |
| 2012/0146580 A1 | 6/2012 | Kitamura |
| 2012/0153731 A9 | 6/2012 | Kirby et al. |
| 2012/0181876 A1 | 7/2012 | Baarman et al. |
| 2012/0206307 A1 | 8/2012 | Orihara et al. |
| 2012/0235636 A1 | 9/2012 | Partovi |
| 2012/0289153 A1 | 11/2012 | Dobyns |
| 2012/0309307 A1 | 12/2012 | D'Amico |
| 2012/0319500 A1 | 12/2012 | Beart et al. |
| 2012/0319647 A1 | 12/2012 | Itabashi et al. |
| 2013/0005251 A1 | 1/2013 | Soar |
| 2013/0026981 A1 | 1/2013 | Van Der Lee |
| 2013/0033118 A1 | 2/2013 | Karalis et al. |
| 2013/0038278 A1 | 2/2013 | Park et al. |
| 2013/0127404 A1 | 5/2013 | Maenpaa |
| 2013/0221910 A1 | 8/2013 | Kim et al. |
| 2013/0229252 A1 | 9/2013 | Nogi et al. |
| 2013/0249312 A1 | 9/2013 | Uchida et al. |
| 2013/0249661 A1 | 9/2013 | Motomiya et al. |
| 2013/0267170 A1 | 10/2013 | Chong et al. |
| 2013/0293191 A1 | 11/2013 | Hidaka et al. |
| 2013/0342162 A1 | 12/2013 | Tabata et al. |
| 2014/0232335 A1 | 8/2014 | Tabata et al. |
| 2014/0306656 A1 | 10/2014 | Tabata et al. |
| 2014/0349573 A1 | 11/2014 | Moes et al. |
| 2014/0375262 A1 | 12/2014 | Yamaguchi et al. |
| 2015/0091524 A1 | 4/2015 | Park et al. |
| 2015/0116178 A1 | 4/2015 | Kim et al. |
| 2015/0222143 A1 | 8/2015 | Osada et al. |

FOREIGN PATENT DOCUMENTS

| | | |
|---|---|---|
| CN | 101971452 A | 2/2011 |
| CN | 102017353 A | 4/2011 |
| CN | 102084440 A | 6/2011 |
| CN | 102208926 A | 10/2011 |
| EP | 1 814 191 A2 | 8/2007 |
| EP | 1 928 003 A2 | 6/2008 |
| EP | 1 944 851 A2 | 7/2008 |
| EP | 2 017 860 A2 | 1/2009 |
| EP | 2 081 199 A1 | 7/2009 |
| EP | 2 172 952 A1 | 4/2010 |
| EP | 2 244 351 A2 | 10/2010 |
| EP | 2 246 864 A1 | 11/2010 |
| EP | 2 258 032 A2 | 12/2010 |
| EP | 1 928 003 B1 | 1/2011 |
| EP | 2 284 849 A1 | 2/2011 |
| EP | 2 296 228 A1 | 3/2011 |
| EP | 2 348 517 A1 | 7/2011 |
| EP | 2 367 262 A2 | 9/2011 |
| EP | 2 456 044 A1 | 5/2012 |
| EP | 2 546 844 A1 | 1/2013 |
| EP | 2 620 961 A1 | 7/2013 |
| EP | 2 712 053 A1 | 3/2014 |
| EP | 2 244 351 B1 | 9/2015 |
| JP | 56-170187 U | 12/1981 |
| JP | 05-144108 A | 6/1993 |
| JP | 07-231586 A | 8/1995 |
| JP | 07-299150 A | 11/1995 |
| JP | 11-40207 A | 2/1999 |
| JP | 11-122146 A | 4/1999 |
| JP | 11-265814 A | 9/1999 |
| JP | 2002-354713 A | 12/2002 |
| JP | 2003-045731 A | 2/2003 |
| JP | 2003-068531 A | 3/2003 |
| JP | 2003-255288 A | 9/2003 |
| JP | 2004-047701 A | 2/2004 |
| JP | 2004-110854 A | 4/2004 |
| JP | 2005-070855 A | 3/2005 |
| JP | 2005-224603 A | 8/2005 |
| JP | 2005-252612 A | 9/2005 |
| JP | 2006-032589 A | 2/2006 |
| JP | 2006-042519 A | 2/2006 |
| JP | 2006-126901 A | 5/2006 |
| JP | 2006-315368 A | 11/2006 |
| JP | 2007-214754 A | 8/2007 |
| JP | 2008-027015 A | 2/2008 |
| JP | 2008-087733 A | 4/2008 |
| JP | 2008-125115 A | 5/2008 |
| JP | 2008-135589 A | 6/2008 |
| JP | 2008-172872 A | 7/2008 |
| JP | 2008-172874 A | 7/2008 |
| JP | 2008-205214 A | 9/2008 |
| JP | 2008-205557 A | 9/2008 |
| JP | 2008-206297 A | 9/2008 |
| JP | 2008-210861 A | 9/2008 |
| JP | 2008-235860 A | 10/2008 |
| JP | 2008-289241 A | 11/2008 |
| JP | 2008-294385 A | 12/2008 |
| JP | 2008-300398 A | 12/2008 |
| JP | 2009-005475 A | 1/2009 |
| JP | 2009-027025 A | 2/2009 |
| JP | 2009-159660 A | 7/2009 |
| JP | 2009-182902 A | 8/2009 |
| JP | 2009-200174 A | 9/2009 |
| JP | 2009-247125 A | 10/2009 |
| JP | 2009-253649 A | 10/2009 |
| JP | 2009-259273 A | 11/2009 |
| JP | 2009-277820 A | 11/2009 |
| JP | 2009-284657 A | 12/2009 |
| JP | 2010-016235 A | 1/2010 |
| JP | 4400509 B2 | 1/2010 |
| JP | 2010-041906 A | 2/2010 |
| JP | 2010-050515 A | 3/2010 |
| JP | 2010-128219 A | 6/2010 |
| JP | 2010-129692 A | 6/2010 |
| JP | 2010-207017 A | 9/2010 |
| JP | 2010-213570 A | 9/2010 |
| JP | 2010-219652 A | 9/2010 |
| JP | 2010-226929 A | 10/2010 |
| JP | 2010-239781 A | 10/2010 |
| JP | 2010-239838 A | 10/2010 |
| JP | 2010-252624 A | 11/2010 |
| JP | 2010-258913 A | 11/2010 |
| JP | 2010-259172 A | 11/2010 |
| JP | 2010-283263 A | 12/2010 |
| JP | 2010-284059 A | 12/2010 |
| JP | 2011-024360 A | 2/2011 |
| JP | 2011-049936 A | 3/2011 |
| JP | 2011-072074 A | 4/2011 |
| JP | 2011-072097 A | 4/2011 |
| JP | 2011-072116 A | 4/2011 |
| JP | 4669560 B1 | 4/2011 |
| JP | 2011-101524 A | 5/2011 |
| JP | 2011-103533 A | 5/2011 |
| JP | 2011-103694 A | 5/2011 |
| JP | 2011-514796 A | 5/2011 |
| JP | 2011-155520 A | 8/2011 |
| JP | 3169797 U | 8/2011 |
| JP | 4835800 B1 | 10/2011 |
| JP | 4835786 B1 | 12/2011 |
| JP | 2012-010533 A | 1/2012 |
| JP | 2012-070557 A | 4/2012 |
| JP | 2012-084893 A | 4/2012 |
| JP | 2012-119662 A | 6/2012 |
| JP | 4962634 B1 | 6/2012 |
| JP | 2012-156279 A | 8/2012 |
| JP | 2012-157147 A | 8/2012 |
| JP | 5013019 B1 | 8/2012 |
| JP | 2013-021902 A | 1/2013 |
| WO | 2007/080820 A1 | 7/2007 |
| WO | 2007/122788 A1 | 11/2007 |
| WO | 2008/156025 A1 | 12/2008 |
| WO | 2009/053801 A1 | 4/2009 |
| WO | 2009/105615 A2 | 8/2009 |
| WO | 2009/114671 A1 | 9/2009 |
| WO | 2011/007661 A1 | 1/2011 |
| WO | 2011/016737 A1 | 2/2011 |
| WO | 2011/096569 A1 | 8/2011 |

(56) References Cited

FOREIGN PATENT DOCUMENTS

WO  2012/073305 A1  6/2012
WO  2013/084480 A1  6/2013

OTHER PUBLICATIONS

Brooke Crothers, Getting a look inside the iPhone 4, Nanotech—The Circuits Blog—CNET News, Jun. 22, 2010, 5 pages.
English Translation of Chinese Search Report dated May 29, 2015, for corresponding CN Application No. 201280039867.7, 3 pages.
Extended European Search Report, dated Oct. 8, 2014, for corresponding European Application No. 12801388.5-1556/2712053, 8 pages.
Extended European Search Report, dated Jun. 2, 2015, for corresponding EP Application No. 12846180.3-1812 / 2775632, 5 pages.
Final Office Action dated Nov. 28, 2016, for corresponding U.S. Appl. No. 14/376,574, 27 pages.
International Search Report, dated Apr. 2, 2013, for corresponding International Application No. PCT/JP2013/000553, 4 pages. (With English Translation).
International Search Report dated Apr. 3, 2012, for corresponding International Application No. PCT/JP2011/007345, 2 pages.
International Search Report, dated Dec. 4, 2012, for PCT/JP2012/006644, 4 pages. (With English Translation).
International Search Report dated Dec. 27, 2011, for corresponding International Application No. PCT/JP2011/006025, 4 pages.
International Search Report dated Sep. 4, 2012, for corresponding International Application No. PCT/JP2012/003914, 8 pages.
International Search Report dated Jun. 18, 2013, for corresponding International Application No. PCT/JP2013/003317, 2 pages.
International Search Report dated Aug. 20, 2013, for related International Application No. PCT/JP2013/003316, 4 pages.
International Search Report dated Aug. 20, 2013, for related International Application No. PCT/JP2013/003315, 6 pages.
Korean Office Action, dated Mar. 6, 2015, for corresponding KR Application No. 10-2014-709494, 12 pages. (With English Translation).
Notice of Reasons for Refusal, dated Oct. 25, 2016, for corresponding JP Application No. 2012-145962, 6 pages.
Notification of First Chinese Office Action, dated Mar. 30, 2015, for corresponding CN Application No. 201280053655.4, 13 pages. (With English Translation).
Notification of Reasons for Refusal, dated Apr. 12, 2016, for corresponding JP Application No. 2012-154861, 7 pages. (With English Translation).
Partial English Translation of Japanese Office Action dated May 10, 2011, for corresponding JP Application No. 2011/013619, 6 pages.
Partial English Translation of Japanese Office Action dated Sep. 6, 2011, for corresponding JP Application No. 2011-135946, 6 pages.
Wireless Power Consortium, "System Description Wireless Power Transfer," vol. 1: Low Power, Part 1: Interface Definition, V 1.0.1, Oct. 2010, 86 pages.
English Translation of Notification of Reasons for Refusal, dated Aug. 1, 2017, corresponding to Japanese Application No. 2016-147734, 8 pages.
Non-Final Office Action, dated Oct. 20, 2017, for corresponding U.S. Appl. No. 15/051,408, 22 pages.
Non-Final Office Action, dated Jul. 5, 2017, for corresponding U.S. Appl. No. 15/235,885, 32 pages.
Non-Final Office Action, dated Jun. 12, 2017, for corresponding U.S. Appl. No. 13/876,509, 14 pages.
Notice of Allowance, dated Apr. 19, 2017, for corresponding U.S. Appl. No. 14/410,555, 13 pages.

FIG. 4A
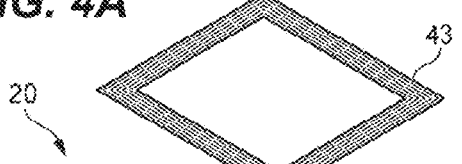
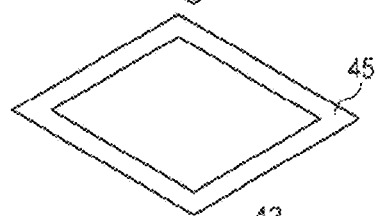
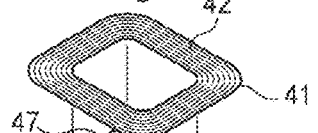
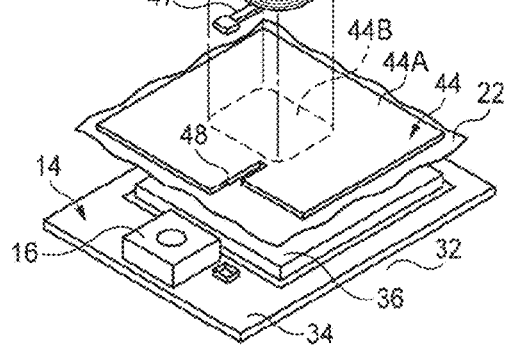
FIG. 4B
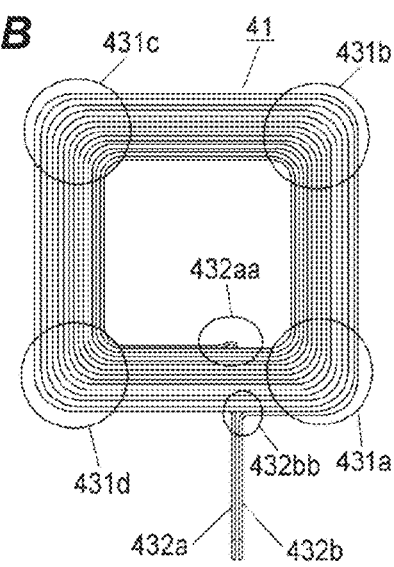
FIG. 4C
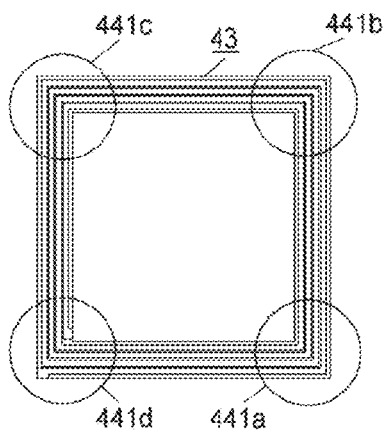
FIG. 4D
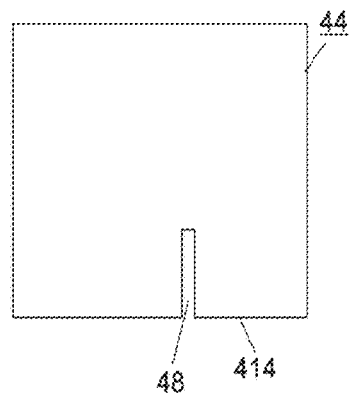
FIG. 4E
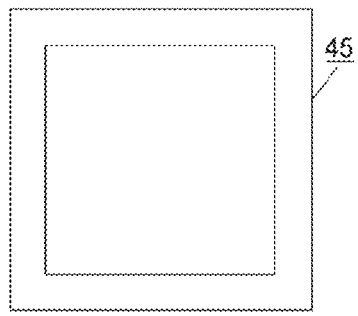

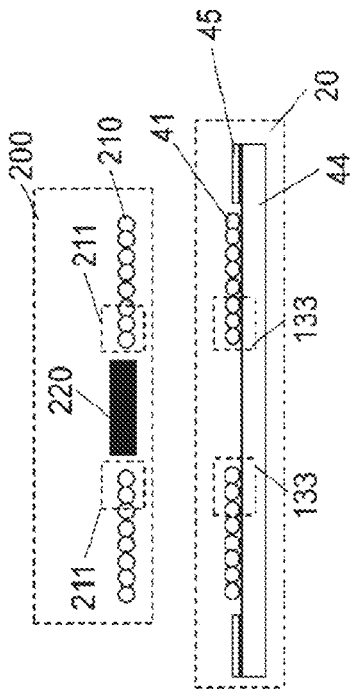
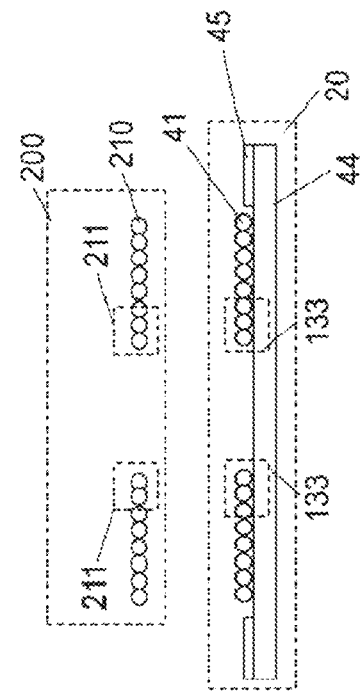
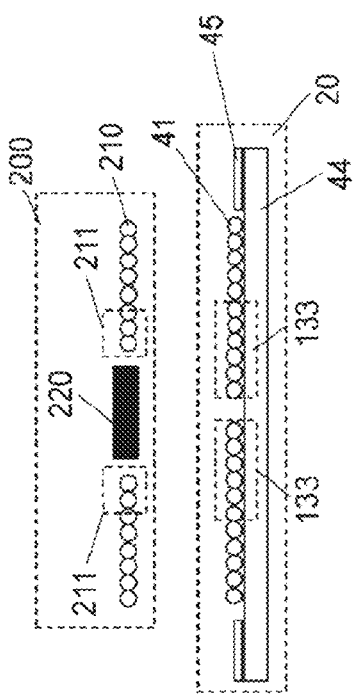
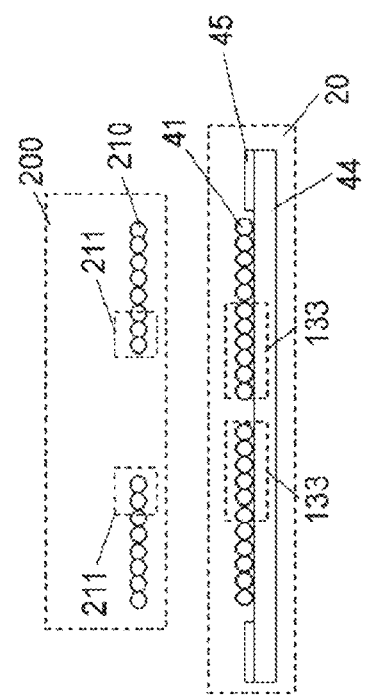

MOBILE TERMINAL AND CHARGEABLE COMMUNICATION MODULE

BACKGROUND

Technical Field

The present invention relates to a mobile terminal which includes a non-contact charging module including a non-contact charging module and an NFC antenna.

Description of the Related Art

In recent years, NFC (Near Field Communication) antennas that utilize RFID (Radio Frequency IDentification) technology and use radio waves in the 13.56 MHz band and the like are being used as antennas that are mounted in communication apparatuses such as mobile terminal devices. To improve the communication efficiency, an NFC antenna is provided with a magnetic sheet that improves the communication efficiency in the 13.56 MHz band and thus configured as an NFC antenna module. Technology has also been proposed in which a non-contact charging module is mounted in a communication apparatus, and the communication apparatus is charged by non-contact charging. According to this technology, a power transmission coil is disposed on the charger side and a power reception coil is provided on the communication apparatus side, electromagnetic induction is generated between the two coils at a frequency in a band between approximately 100 kHz and 200 kHz to thereby transfer electric power from the charger to the communication apparatus side. To improve the communication efficiency, the non-contact charging module is also provided with a magnetic sheet that improves the efficiency of communication in the band between approximately 100 kHz and 200 kHz.

Mobile terminals that include such NFC modules and non-contact charging modules have also been proposed (for example, see PTL 1).

CITATION LIST

Patent Literature

PTL 1
Japanese Patent No. 4669560

BRIEF SUMMARY

Technical Problem

The term "NFC" refers to short-range wireless communication that achieves communication by electromagnetic induction using a frequency in the 13.56 MHz band. Further, non-contact charging transmits power by electromagnetic induction using a frequency in a band between approximately 100 kHz and 200 kHz. Accordingly, an optimal magnetic sheet for achieving highly efficient communication (power transmission) in the respective frequency bands differs between an NFC module and a non-contact charging module. On the other hand, since both the NFC module and the non-contact charging module perform communication (power transmission) by electromagnetic induction, the NFC module and the non-contact charging module are liable to interfere with each other. That is, there is a possibility that when one of the modules is performing communication, the other module will take some of the magnetic flux, and there is also the possibility that an eddy current will be generated in the other coil and weaken electromagnetic induction of the one module that is performing communication.

Therefore, in PTL 1, the NFC module and the non-contact charging module each include a magnetic sheet and are each arranged as a module, which in turn hinders miniaturization of the communication apparatus. The communication directions of the NFC module and the non-contact charging module are made to differ so that mutual interference does not arise when the respective modules perform communication, and as a result the communication apparatus is extremely inconvenient because the communication surface changes depending on the kind of communication. In addition, in recent years there has been an increase in the use of smartphones in which a large proportion of one surface of the casing serves as a display portion, so that if the aforementioned communication apparatus is applied to a smartphone it is necessary to perform one of the kinds of communication on the surface where the display section exists.

Also, when the non-contact charging module is provided in the mobile terminal, downsizing the mobile terminal is difficult and there is a room for improvement.

An object of the present invention is to provide a mobile terminal that may achieve a reduction of thickness by making a non-contact charging coil, an NFC antenna, and a magnetic sheet into a single module, and that may achieve a communication and a power transmission in the same direction. Also, another object of the present invention is to improve both power transmission efficiency of the non-contact charging and communication efficiency of NFC communication by laminating two types of magnetic sheets.

Solution to Problem

The mobile terminal of the present invention comprises a housing, a battery pack contained in the housing, and a non-contact charging module contained in the housing. The non-contact charging module includes a charging coil formed of a wound conducting wire, an NFC coil arranged so as to surround the charging coil, a first magnetic sheet supporting the charging coil, and a second magnetic sheet placed on the first magnetic sheet and supporting the NFC coil. The battery pack is arranged in a first area in a plane normal to a thickness direction of the housing, and the non-contact charging module is arranged in a second area adjacent to the first area. The non-contact charging module overlaps with a cross point between a first center line of the second area, which extends in parallel to an interface between the first area and the second area, and a second center line of the second area, which extends orthogonal to the interface and extends in a width direction of the housing.

The battery pack is arranged in the first area and the non-contact charging module is arranged in the second area. Therefore, the battery pack and the non-contact charging module are arranged adjacent to each other. Thus, connecting the battery pack to the non-contact charging module may be easy.

The non-contact charging module overlaps with a cross point between the first center line of the second area, which extends in parallel to an interface between the first area and the second area, and a second center line of the second area, which extends in a width direction of the housing.

Therefore, weight imbalance caused by non-contact charging module in the interface direction of housing may be avoided.

The mobile terminal of the present invention comprises a housing, a battery pack contained in the housing, and a non-contact charging module contained in the housing. The non-contact charging module includes a charging coil formed of a wound conducting wire, an NFC coil arranged so as to surround the charging coil, a first magnetic sheet supporting the charging coil, and a second magnetic sheet placed on the first magnetic sheet and supporting the NFC coil. The battery pack is arranged in a first area in a plane normal to a thickness direction of the housing, and the non-contact charging module is arranged in a second area adjacent to the first area. The non-contact charging module overlaps with a cross point between a first center line of the second area, which extends in parallel to an interface between the first area and the second area, and a second center line of the second area, which extends orthogonal to the interface and extends in a width direction of the battery pack.

The battery pack is arranged in the first area and the non-contact charging module is arranged in the second area.

Therefore, the battery pack and the non-contact charging module are arranged adjacent to each other. Thus, connecting the battery pack to the secondary-side non-contact charging module may be easy.

The non-contact charging module overlaps with a cross point between the first center line of the second area, which extends in parallel to an interface between the first area and the second area, and a second center line of the second area, which extends in a width direction of the battery pack.

Therefore, weight imbalance caused by non-contact charging module in the interface direction of battery pack may be avoided.

The mobile terminal of the present invention comprises a housing, a battery pack contained in the housing, and a non-contact charging module contained in the housing. The non-contact charging module includes a charging coil formed of a wound conducting wire, an NFC coil arranged so as to surround the charging coil, a first magnetic sheet supporting the charging coil, and a second magnetic sheet placed on the first magnetic sheet and supporting the NFC coil. The battery pack is arranged in a first area in a plane normal to a thickness direction of the housing, and the non-contact charging module is arranged in a second area adjacent to the first area. The non-contact charging module is arranged on a side closer to the first area relative to a first center line of the second area extending in parallel to an interface between the first area and the second area.

The battery pack is arranged in the first area and the non-contact charging module is arranged in the second area.

Therefore, the battery pack and the non-contact charging module are arranged adjacent to each other. Thus, connecting the battery pack to the non-contact charging module may be easy.

The non-contact charging module is arranged on a side closer to the first area relative to the first center line of the second area extending in parallel to the interface between the first area and the second area.

Therefore, the weight of non-contact charging module is not biased to an opposite side of the first area relative to the first center line of the second area. Thus, causing discomfort to a user may be avoided.

Advantageous Effects of Invention

According to the present invention, a non-contact charging module and a communication apparatus that enable a reduction in size by making a non-contact charging coil, an NFC antenna, and a magnetic sheet into a single module, that can ease adverse effects by modularization and that also enable communication and power transmission in the same direction.

BRIEF DESCRIPTION OF THE DRAWINGS

FIGS. 4A to 4E are an exploded view of a secondary-side non-contact charging module according to a first embodiment.

FIGS. 5A to 5D illustrate relations between a primary-side non-contact charging module that includes a magnet, and a charging coil;

DETAILED DESCRIPTION

An embodiment of a mobile terminal according to an embodiment of the present invention will be described with reference to the accompanying drawings.

The First Embodiment

Figure 1:
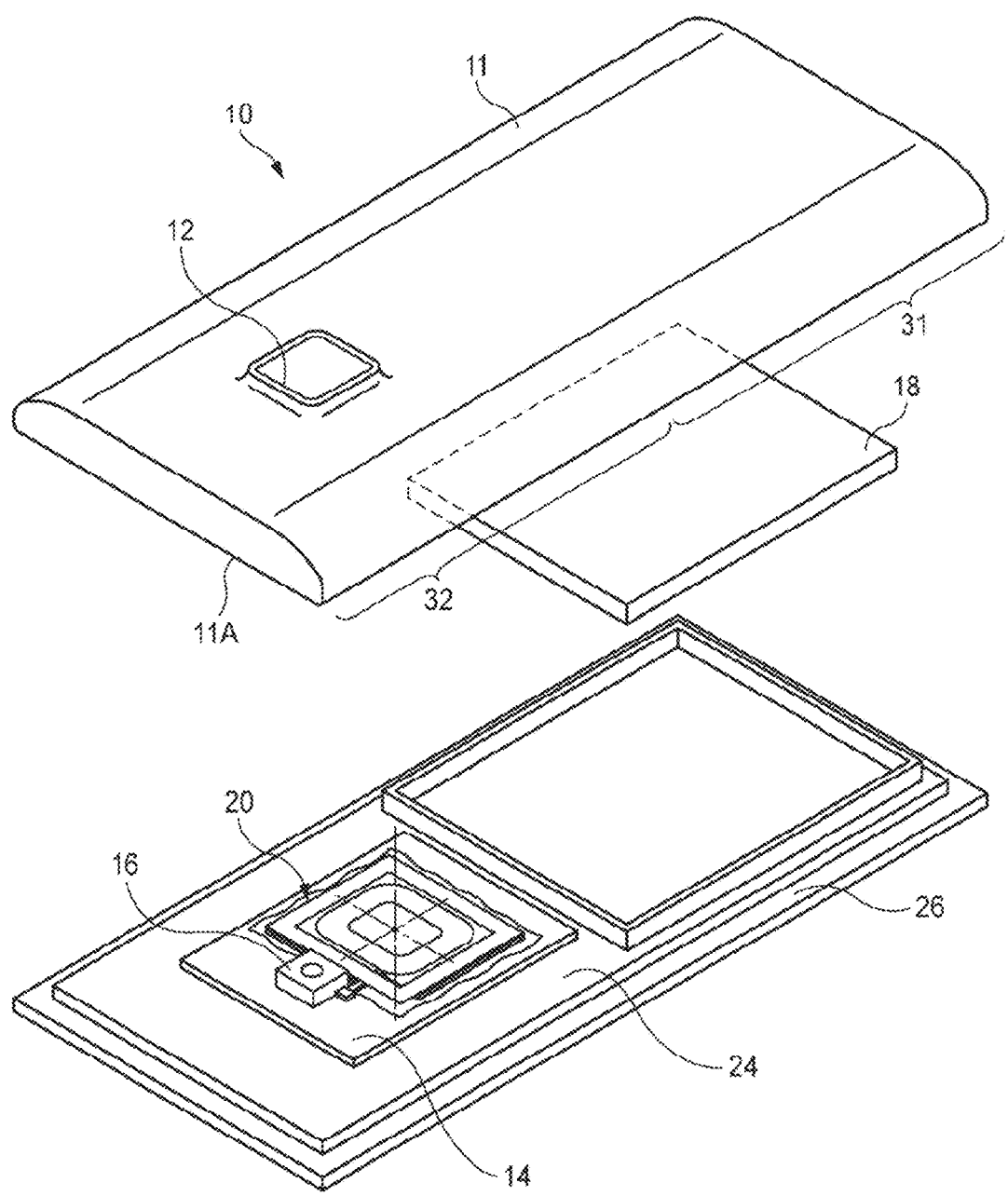
FIG. 1 is an exploded perspective view of a mobile terminal according to a first embodiment of the present invention.

As shown in FIG. 1, a mobile terminal 10 includes a housing 11, a communicating hole 12 through which the inside and the outside of the housing 11 communicate, a camera unit 16 mounted on a circuit board 14, a battery pack housed in the housing 11, and a secondary-side non-contact charging module (non-contact charging module) 20.

Figure 2A:
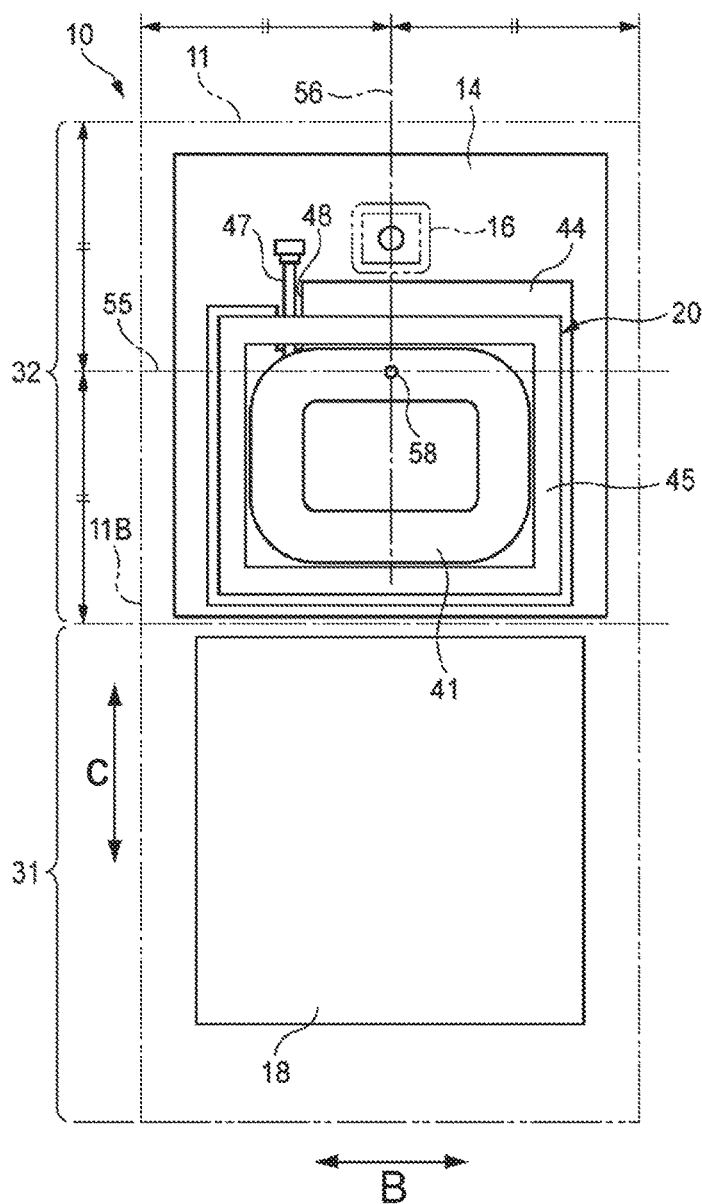
FIG. 2A is a plane view of a mobile terminal and FIG. 2B is a side view of a mobile terminal according to a first embodiment.
Figure 2B:
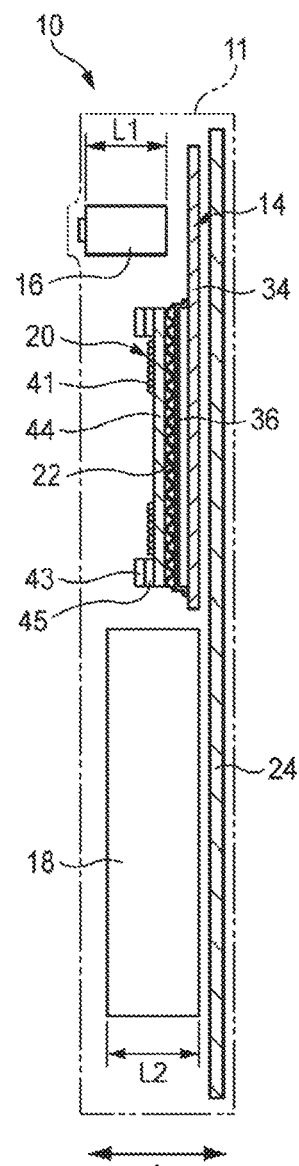

Furthermore, the mobile terminal 10 includes a heat dissipating sheet 22 (which is shown in FIG. 2B) provided on the secondary-side non-contact charging module 20, a display unit 24 provided at a side of an aperture 11A of the housing 11A, and a protection cover 26 covering the display unit 24.

As described in FIGS. 2A and 2B, the housing 11 is formed into a substantially rectangular shape in a plane normal to a thickness direction of the housing 11. The housing 11 includes a first area positioned at the opposite of the communicating hole 12 in a plane normal and a second area 32 positioned adjacent to the first area 31.

The battery pack 18 is located in the first area 31 and the secondary-side non-contact charging module 20 and the camera unit 16 are located in the second area 32.

Figure 3:
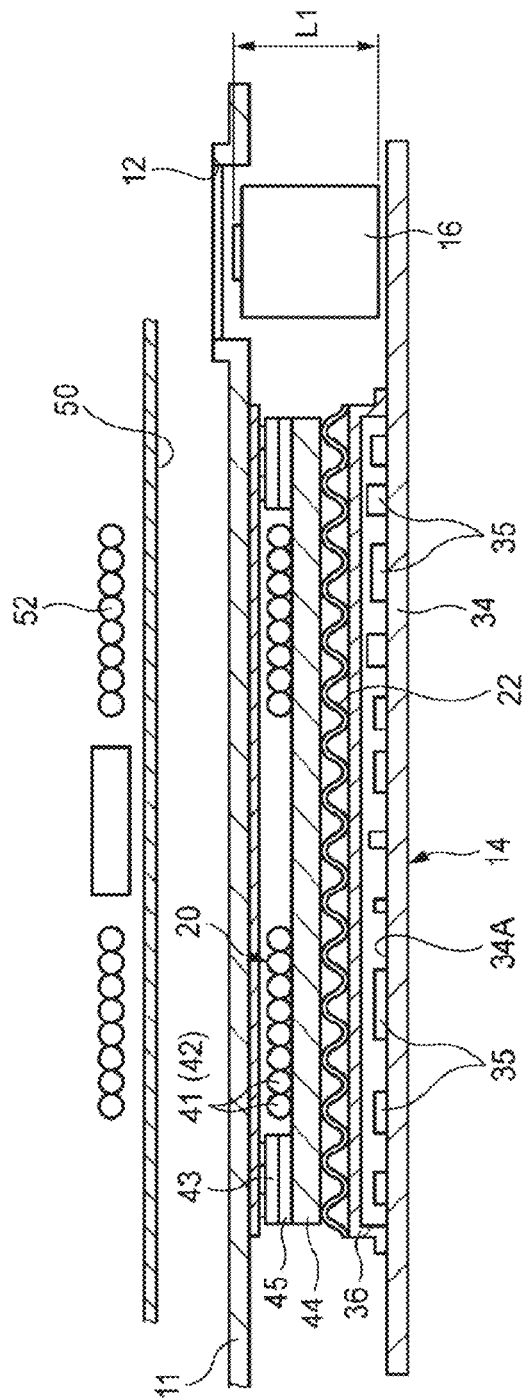
FIG. 3 is a cross-section view of a circuit board and a secondary-side non-contact charging module of a first embodiment.

As described in FIG. 3, the circuit board 14 includes a base substrate 34 located in the second area 32 of the housing 11 and a plurality of electronic components which are located on a side 34A facing the secondary-side non-contact charging module 20.

Also, the circuit board 14 is provided with a shield case 36 covering the plurality of electronic components which are located on the side 34A facing the secondary-side non-contact charging module 20.

The camera unit 16 is located on the side 34A facing the secondary-side non-contact charging module 20 of the base substrate 34 and includes a camera module capable of taking an image through the communicating hole 12.

As describe in FIGS. 2A and 2B, the battery pack 18 is formed into a substantially rectangular shape and located in the first area 31 in a plane normal to the thickness direction of the housing 11.

As described in FIG. 4A, the secondary-side non-contact charging module 20 is located in the second area 32 of the housing 11 (as shown in FIG. 2A). And the secondary-side non-contact charging module 20 includes a charging coil 41 that includes a wound conducting wire 42 and a NFC coil 43 that is disposed so as to surround charging coil 41.

Also, the secondary-side non-contact charging module 20 includes a first magnetic sheet 44 that supports the charging coil 41 and a second magnetic sheet 45 that is placed the NFC coil 43 from the same direction.

Figure 9:
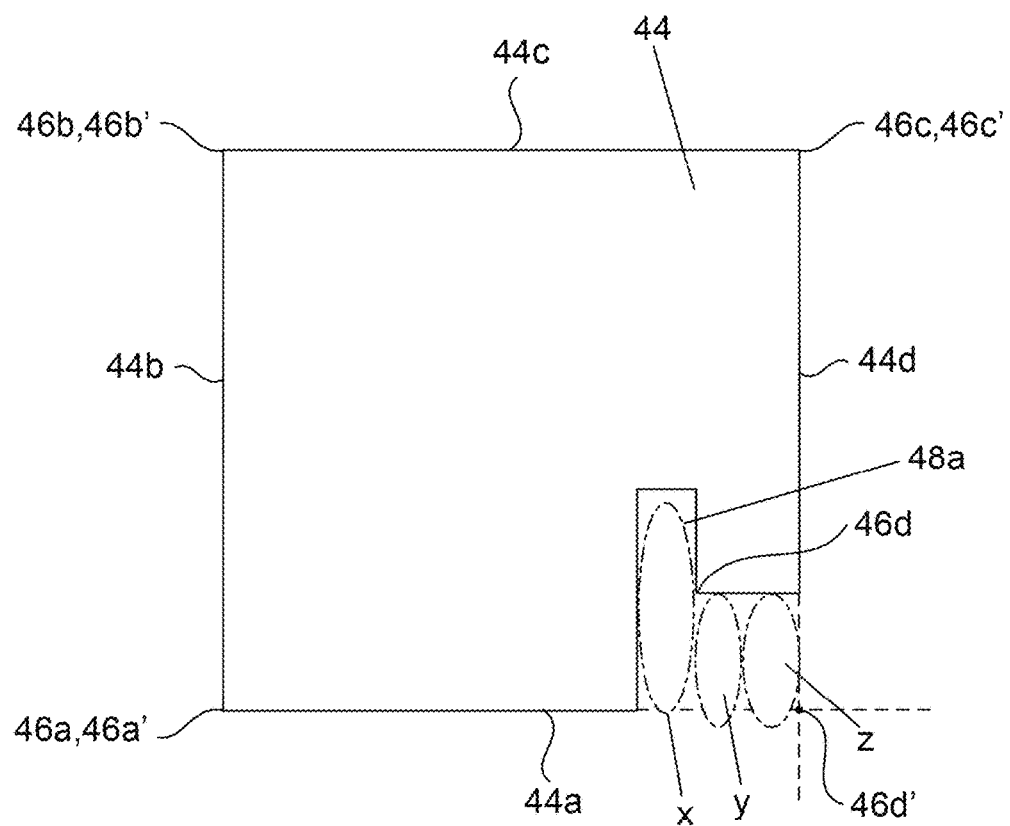
FIG. 9 is a schematic diagram illustrating a first magnetic sheet that includes an L-shaped slit according to a first embodiment.

An insulative double-faced tape or adhesive or the like is used to adhere the upper face of first magnetic sheet 44 and the lower face of second magnetic sheet 45, to adhere the upper face of first magnetic sheet 44 and the lower face of the charging coil 41, and to adhere the upper face of second magnetic sheet 45 and the lower face of the NFC coil 43. It is advantageous to arrange the entire charging coil 41 on first magnetic sheet 44 so as not to protrude therefrom, and to arrange the entire NFC coil 43 on second magnetic sheet 45 so as not to protrude therefrom. It is advantageous to arrange second magnetic sheet 45 so as not to protrude from first magnetic sheet 44. Adopting such a configuration can improve the communication efficiency of both the charging coil 41 and the NFC coil 43. Note that slit 48 is formed in first magnetic sheet 44. The shape of slit 48 may be the shape shown in FIG. 4A (a shape as shown in FIG. 9 that is described later), or may be the shape shown in FIG. 4D. Also, in FIG. 4A, although the slit 48 does not extend to a center portion 44B, the slit 48 may extend to a center portion 44B. This may enable a whole of two leg portions 432$a$ and 432$b$ to be completely housed in the slit 48.

The following is an detailed explanation of the charging coil 41, the NFC coil 43, the first magnetic sheet 44, and the second magnetic sheet 45.

[Regarding Charging Coil]

The charging coil 414 will be described in detail using FIG. 4B.

In the present embodiment, charging coil 41 is wound in a substantially square shape, but may be wound in any shape such as a substantially rectangular shape including a substantially oblong shape, a circular shape, an elliptical shape, and a polygonal shape.

The charging coil 41 has two leg portions (terminals) 432$a$ and 432$b$ as a starting end and a terminating end thereof, and includes a litz wire constituted by around 8 to 15 conducting wires having a diameter of approximately 0.1 mm or a plurality of wires (preferably, around 2 to 15 conducting wires having a diameter of 0.08 mm to 0.3 mm) that is wound around a hollow portion as though to draw a swirl on the surface. For example, in the case of a coil including a wound litz wire made of 12 conducting wires having a diameter of 0.1 mm, in comparison to a coil including a single wound conducting wire having the same cross-sectional area, the alternating-current resistance decreases considerably due to the skin effect. If the alternating-current resistance decreases while the coil is operating, heat generation by the coil decreases and thus charging coil 41 that has favorable thermal properties can be realized. At this time, if a litz wire that includes 8 to 15 conducting wires having a diameter of 0.08 mm to 1.5 mm is used, favorable power transfer efficiency can be achieved. If a single wire is used, it is advantageous to use a conducting wire having a diameter between 0.2 mm and 1 mm. Further, for example, a configuration may also be adopted in which, similarly to a litz wire, a single conducting wire is formed of three conducting wires having a diameter of 0.2 mm and two conducting wires having a diameter of 0.3 mm. Terminals 432$a$ and 432$b$ as a current supply section supply a current from a commercial power source that is an external power source to charging coil 41. Note that an amount of current that flows through charging coil 41 is between approximately 0.4 A and 2 A. In the present embodiment the amount of current is 0.7 A.

In charging coil 41 of the present embodiment, a distance between facing sides (a length of one side) of the hollow portion having a substantially square shape is 20 mm (between 15 mm and 25 mm is preferable), and a distance between facing sides (a length of one side) at an outer edge of the substantially square shape is 35 mm (between 25 mm and 45 mm is preferable). Charging coil 41 is wound in a donut shape. In a case where charging coil 41 is wound in a substantially oblong shape, with respect to facing sides of the hollow portion of the substantially oblong shape, a distance between short sides (a length of one side) is 15 mm (between 10 mm and 20 mm is preferable) and a distance between long sides (a length of one side) is 23 mm (between 15 mm and 30 mm is preferable). Further, with respect to facing sides at an outer edge of a substantially square shape, a distance between short sides (a length of one side) is 28 mm (between 15 mm and 35 mm is preferable) and a distance between long sides (a length of one side) is 36 mm (between 20 mm and 45 mm is preferable). In a case where charging coil 41 is wound in a circular shape, the diameter of the hollow portion is 20 mm (between 10 mm and 25 mm is preferable) and the diameter of an outer edge of the circular shape is 35 mm (between 25 mm and 45 mm is preferable).

Further, in some cases charging coil 41 utilizes a magnet for alignment with a coil of a non-contact charging module inside a charger that supplies power to charging coil 41 as a counterpart for power transmission. A magnet in such a case is defined by the standard (WPC) as a circular (coin shaped) neodymium magnet having a diameter of approximately 15.5 mm (approximately 10 mm to 20 mm) and a thickness of approximately 1.5 to 2 mm or the like. A favorable strength of the magnet is approximately 75 mT to 150 mT. Since an interval between a coil of the primary-side non-contact charging module and charging coil 41 is around 2 to 5 mm, it is possible to adequately perform alignment using such a magnet. The magnet is disposed in a hollow portion of the non-contact charging module coil on the primary side or secondary side. In the present embodiment, the magnet is disposed in the hollow portion of charging coil 41.

Figure 11:
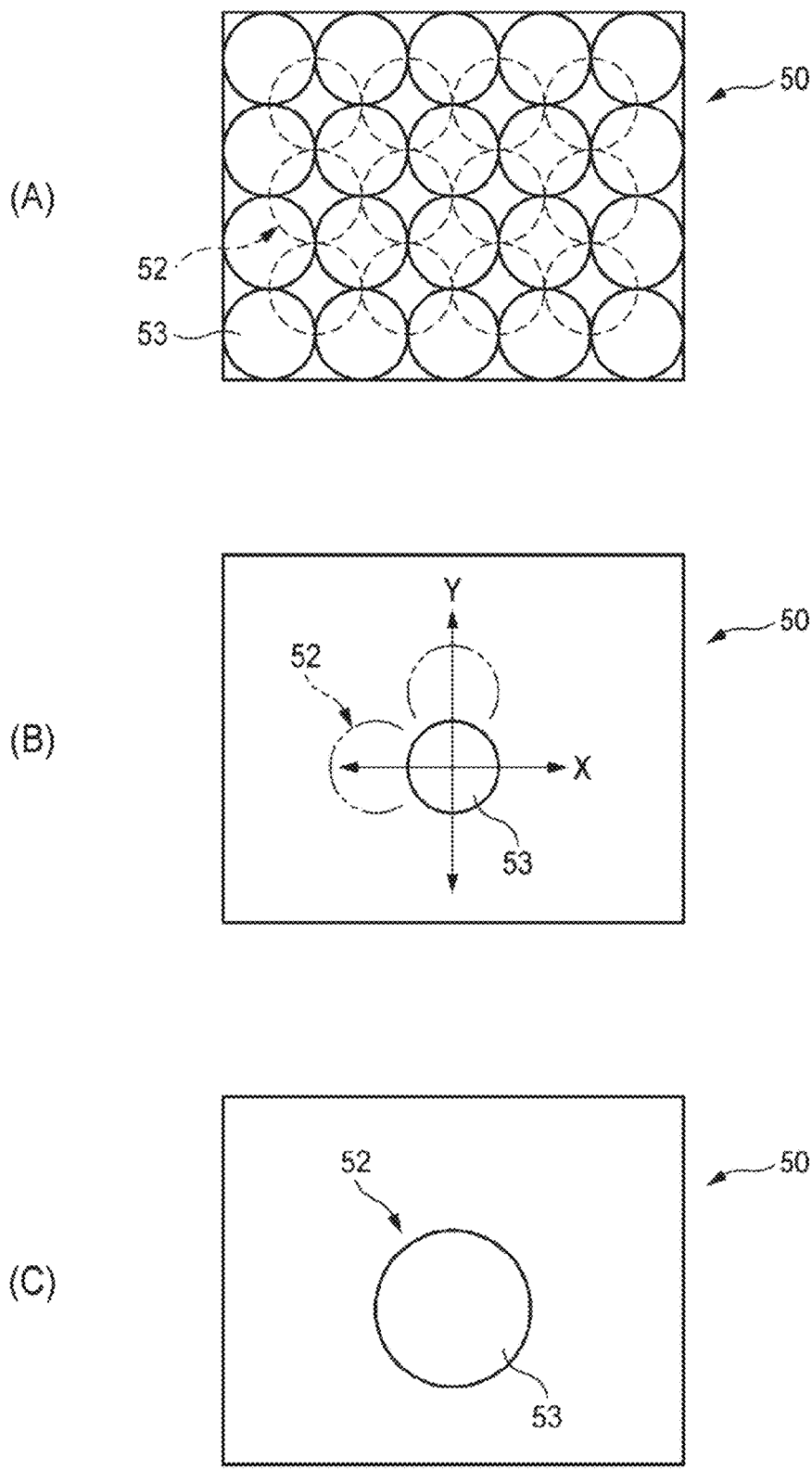
FIG. 11 is a plane view explaining a charger which charges a secondary-side non-contact charging module according to a first embodiment.

That is, for example, the following methods may be mentioned as an aligning method. For example, a method is available in which a protruding portion is formed in a charging surface of a charger, a recessed portion is formed in an electronic device on the secondary side, and the protruding portion is fitted into the recessed portion to thereby physically (geometrically) perform compulsory aligning. A method is also available in which a magnet is mounted on at least one of the primary side and secondary side, and alignment is performed by attraction between the respective magnets or between a magnet on one side and a magnetic sheet on the other side. As described in FIG. 11A, a method is also available in which a large number of coils 53 are provided in a wide area in the primary-side non-contact charging module 52 of the charger 50 (the primary-side) so that the mobile terminal 10 (the secondary-side) can be charged anywhere on the surface of the charger 50. As described in FIG. 11B, a method is also available in which the coil 53 of the primary-side non-contact charging module 52 of the charger 50 (the primary-side) is moved in a direction of the X axial and the Y axial so that the coil 53 can move to a position of the charging coil 41 of the mobile terminal 10 (the secondary-side). Furthermore, as described in FIG. 11C, a method is also available in which the coil 53 of the primary-side non-contact charging module 52 of the charger 50 (the primary-side) is formed to be relatively large so that the charging coil 41 of the mobile terminal 10 (the secondary-side) can be aligned with the coil 53.

Thus, various methods can be mentioned as common methods for aligning the coils of the primary-side (charging-side) non-contact charging module and the secondary-side (charged-side) non-contact charging module, and the methods are divided into methods that use a magnet and methods that do not use a magnet. The secondary-side non-contact charging module 20 is configured to be adaptable to both of a primary side (charging-side) non-contact charging module that uses a magnet and a primary-side non-contact charging module that does not use a magnet. Therefore, charging can be performed regardless of the type of primary-side non-contact charging module, which in turn, improves the convenience of the module.

The influence that a magnet has on the power transmission efficiency of non-contact charging module 100 will be described.

When magnetic flux for electromagnetic induction is generated between the primary-side non-contact charging module and non-contact charging module 20 to transmit power, the presence of a magnet between or around the primary-side non-contact charging module and non-contact charging module 20 leads extension of the magnetic flux to avoid the magnet. Otherwise, the magnetic flux that passes through the magnet becomes an eddy current or generates heat in the magnet and is lost. Furthermore, if the magnet is disposed in the vicinity of first magnetic sheet 44, first magnetic sheet 44 that is in the vicinity of the magnet saturates and the magnetic permeability thereof decreases. Therefore, the magnet that is included in the primary-side non-contact charging module may decrease an L value of charging coil 41. As a result, transmission efficiency between the non-contact charging modules will decrease. To prevent this, in the present embodiment the hollow portion of charging coil 41 is made larger than the magnet. That is, the area of the hollow portion is made larger than the area of a circular face of the coin-shaped magnet, and an inside edge (portion surrounding the hollow portion) of charging coil 41 is configured to be located at a position that is on the outer side relative to the outer edge of the magnet. Further, because the diameter of the magnet is 15.5 mm or less, it is sufficient to make the hollow portion larger than a circle having a diameter of 15.5 mm. As another method, charging coil 41 may be wound in a substantially oblong shape, and a diagonal of the hollow portion having a substantially oblong shape may be made longer than the diameter (maximum 15.5 mm) of the magnet. As a result, since the corner portions (four corners) at which the magnetic flux concentrates of charging coil 41 that is wound in a substantially oblong shape are positioned on the outer side relative to the magnet, the influence of the magnet can be suppressed. Effects obtained by employing the above described configuration are described hereunder.

FIGS. 5A to 5D illustrate relations between the primary-side non-contact charging module including the magnet, and the charging coil. FIG. 5A illustrates a case where the aligning magnet is used when the inner width of the wound charging coil is small. FIG. 5B illustrates a case where the aligning magnet is used when the inner width of the wound charging coil is large. FIG. 5C illustrates a case where the aligning magnet is not used when the inner width of the wound charging coil is small. FIG. 5D illustrates a case where the aligning magnet is not used when the inner width of the wound charging coil is large.

Primary-side non-contact charging module 200 that is disposed inside the charger includes primary-side coil 210, magnet 220, and a magnetic sheet (not illustrated in the drawings). In FIGS. 5A to 5D, first magnetic sheet 44, second magnetic sheet 45, and charging coil 41 inside non-contact charging module 20 are schematically illustrated.

Secondary-side non-contact charging module 20 and primary-side non-contact charging module 200 are aligned so that primary-side coil 210 and charging coil 41 face each other. A magnetic field is generated between inner portion 211 of primary-side coil 210 and inner portion 133 of charging coil 41 and power is transmitted. Inner portion 211 and inner portion 133 face each other. Inner portion 211 and inner portion 33 are close to magnet 220 and are liable to be adversely affected by magnet 220.

In addition, because magnet 220 is disposed in the vicinity of first magnetic sheet 44 and second magnetic sheet 45, the magnetic permeability of the magnetic sheets in the vicinity of magnet 220 decreases. Naturally, second magnetic sheet 45 is closer than second magnetic sheet 45 to magnet 220, and is more liable to be affected by magnet 220. Therefore, magnet 220 included in primary-side non-contact charging module 200 weakens the magnetic flux of primary-side coil 210 and charging coil 41, particularly, at inner portion 211 and inner portion 133, and exerts an adverse effect. As a result, the transmission efficiency of the non-contact charging decreases. Accordingly, in the case illustrated in FIG. 5A, inner portion 133 that is liable to be adversely affected by magnet 220 is large.

In contrast, in the case illustrated in FIG. 5C in which a magnet is not used, the L value increases because the number of turns of charging coil 41 is large. As a result, since there is a significant decrease in the numerical value from the L value in FIG. 5C to the L value in FIG. 5A, when using a wound coil having a small inner width, the L-value decrease rate with respect to an L value in a case where magnet 220 is included for alignment and an L value in a case where magnet 220 is not included is extremely large.

Further, if the inner width of charging coil 41 is smaller than the diameter of magnet 220 as illustrated in FIG. 5A, charging coil 41 is directly adversely affected by magnet 220 to a degree that corresponds to the area of charging coil 41 that faces magnet 220. Accordingly, it is better for the inner width of charging coil 41 to be larger than the diameter of magnet 220.

In contrast, when the inner width of charging coil 41 is large as illustrated in FIG. 5B, inner portion 133 that is liable to be adversely affected by magnet 220 is extremely small. In the case illustrated in FIG. 5D, the L value is smaller than in FIG. 5C because the number of turns of charging coil 41 is less. Consequently, because a decrease in the numerical value from the L value in the case illustrated in FIG. 5D to the L value in the case illustrated in FIG. 5B is small, the L-value decrease rate can be suppressed to a small amount in the case of coils that have a large inner width. Further, as the inner width of charging coil 41 increases, the influence of magnet 220 can be suppressed because the distance from magnet 220 to the edge of the hollow portion of charging coil 41 increases.

Since communication module 20 is mounted in an electronic device or the like, charging coil 41 cannot be made larger than a certain size. Accordingly, if the inner width of charging coil 41 is made large to reduce the adverse effects from magnet 220, the number of turns will decrease and the L value itself will decrease regardless of the presence or absence of a magnet. Therefore, charging coil 41 can be increased to the maximum size in a case where the area of magnet 220 and the area of the hollow portion of charging coil 41 are substantially the same (the outer diameter of magnet 220 is about 0 to 2 mm smaller than the inner width of charging coil 41, or the area of magnet 220 is a proportion of about 75% to 95% relative to the area of the hollow portion of charging coil 41). Hence, the accuracy of the alignment between the primary-side non-contact charging module and the secondary-side non-contact charging module can be improved. Further, if the area of magnet 220 is less than the area of the hollow portion of charging coil 41 (the outer diameter of magnet 220 is about 2 to 8 mm smaller than the inner width of charging coil 41, or the area of magnet 220 is a proportion of about 45% to 75% relative to the area of the hollow portion of charging coil 41), even if there are variations in the alignment accuracy, it is possible to ensure that magnet 220 is not present at a portion at which inner portion 211 and inner portion 33 face each other.

In addition, as charging coil 41 that is mounted in non-contact charging module 20 having the same lateral width and vertical width, the influence of magnet 220 can be suppressed more by winding the coil in a substantially rectangular shape rather than in a circular shape. That is, comparing a circular coil in which the diameter of a hollow portion is represented by "x" and a substantially square coil in which a distance between facing sides of the hollow portion (a length of one side) is represented by "x," if conducting wires having the same diameter as each other are wound with the same number of turns, the respective conducting wires will be housed in respective non-contact charging modules 100 that have the same width. In such case, length y of a diagonal of the hollow portion of the substantially square-shaped coil will be such that y>x. Accordingly, if the diameter of magnet 220 is taken as "m," a distance (x−m) between the innermost edge of the circular coil and magnet 220 is always constant (x>m). On the other hand, a distance between the innermost edge of a substantially rectangular coil and magnet 220 is a minimum of (x−m), and is a maximum of (y−m) at corner portions 431a to 431d. When charging coil 41 includes corners such as corner portions 431a to 431d, magnetic flux concentrates at the corners during power transmission. That is, corner portions 431a to 431d at which the most magnetic flux concentrates are furthest from magnet 220, and moreover, the width (size) of non-contact charging module 100 does not change. Accordingly, the power transmission efficiency of power reception coil 30 can be improved without making non-contact charging module 100 a large size.

The size of charging coil 41 can be reduced further if charging coil 41 is wound in a substantially oblong shape. That is, even if a short side of a hollow portion that is a substantially oblong shape is smaller than m, as long as a long side thereof is larger than m it is possible to dispose four corner portions outside of the outer circumference of magnet 220. Accordingly, when charging coil 41 is wound in a substantially oblong shape around a hollow portion having a substantially oblong shape, charging coil 41 can be wound in a favorable manner as long as at least the long side of the hollow portion is larger than m. Note that, the foregoing description of a configuration in which the innermost edge of charging coil 41 is on the outer side of magnet 220 that is provided in primary-side non-contact charging module 200 and in which four corners of the substantially rectangular hollow portion of charging coil 41 that is wound in a substantially rectangular shape are on the outside of magnet 220 refers to a configuration as shown in FIG. 5B. That is, the foregoing describes a fact that when an edge of the circular face of magnet 220 is extended in the stacking direction and caused to extend as far as non-contact charging module 20, a region surrounded by the extension line is contained within the hollow portion of charging coil 41.

Figure 6:
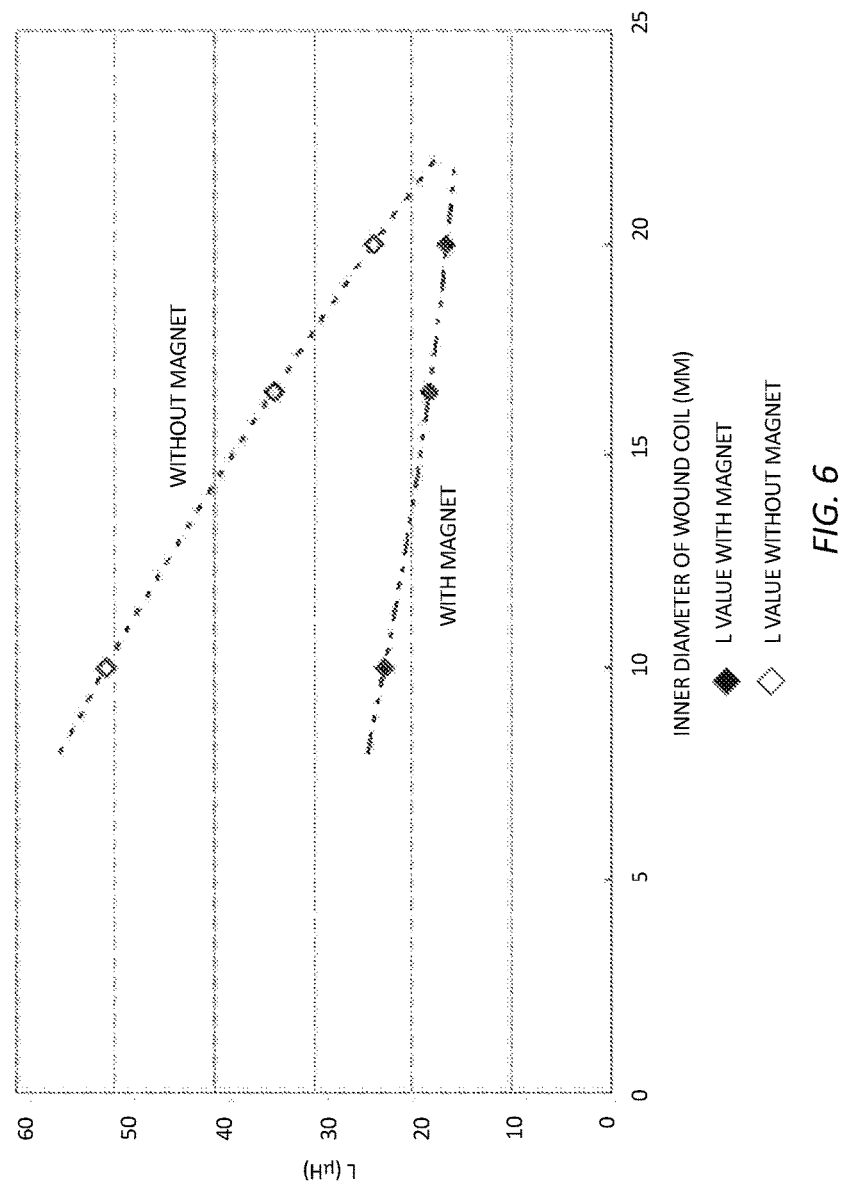
FIG. 6 illustrates a relation between the size of an inner diameter of a hollow portion of a charging coil and an L value of the charging coil when an outer diameter of the hollow portion of the charging coil is kept constant with respect to a case where a magnet is provided in a primary-side non-contact charging module and a case where a magnet is not provided therein.

FIG. 6 illustrates a relation between the size of the inner diameter of the wound charging coil and the L value of the charging coil when the outer diameter of the wound charging coil is kept constant, with respect to a case where a magnet is provided in the primary-side non-contact charging module and a case where the magnet is not provided therein. As shown in FIG. 6, when the size of magnet 220 and the outer diameter of charging coil 41 are kept constant, the influence of magnet 220 on charging coil 41 decreases as the number of turns of charging coil 41 decreases and the inner diameter of charging coil 41 increases. That is, the L value of charging coil 41 in a case where magnet 220 is utilized for alignment between the primary-side non-contact charging module and the secondary-side non-contact charging module and the L value of charging coil 41 in a case where magnet 220 is not utilized for alignment approach each other. Accordingly, a resonance frequency when magnet 220 is used and a resonance frequency when magnet 220 is not used become extremely similar values. At such time, the outer diameter of the wound coil is uniformly set to 30 mm. Further, by making the distance between the edge of the hollow portion of the charging coil 41 (innermost edge of charging coil 41) and the outer edge of magnet 220 greater than 0 mm and less than 6 mm, the L values in the case of utilizing magnet 220 and the case of not utilizing magnet 220 can be made similar to each other while maintaining the L values at 15 μH or more.

The conducting wire of charging coil 41 may be a single conducting wire that is stacked in a plurality of stages, and the stacking direction in this case is the same as the stacking direction in which first magnetic sheet 44 and charging coil 41 are stacked. At such time, by stacking the layers of conducting wire that are arranged in the vertical direction with a space interposed in between, stray capacitance between conducting wire on an upper stage and conducting wire on a lower stage decreases, and the alternating-current resistance of charging coil 41 can be suppressed to a small amount. Further, the thickness of charging coil 41 can be minimized by winding the conducting wire densely. By stacking the conducting wire in this manner, the number of turns of charging coil 41 can be increased to thereby improve the L value. However, in comparison to winding of the charging coil 41 in a plurality of stages in the stacking direction, winding of charging coil 41 in one stage can lower the alternating-current resistance of charging coil 41 and raise the transmission efficiency.

If charging coil 41 is wound in a polygonal shape, corner portions (corners) 431a to 431d are provided as described below. Charging coil 41 that is wound in a substantially square shape refers to a coil in which R (radius of a curve at the four corners) of corner portions 431a to 431d that are four corners of the hollow portion is equal to or less than 30% of the edge width of the hollow portion. That is, in FIG. 4B, in the substantially square hollow portion, the four corners have a curved shape. In comparison to right angled corners, the strength of the conducting wire at the four corners can be improved when the corners are curved to some extent. However, if R is too large, there is almost no difference from a circular coil and it will not be possible to obtain effects that are only obtained with a substantially square charging coil 41. It has been found that when the edge width of the hollow portion is, for example, 20 mm, and radius R of a curve at each of the four corners is 6 mm or less, the influence of a magnet can be effectively suppressed. Further, when taking into account the strength of the four corners as described above, the greatest effect of the rectangular coil described above can be obtained by making radius R of a curve at each of the four corners an amount that corresponds to a proportion of 5 to 30% relative to the edge width of the substantially square hollow portion. Note that, even in the case of charging coil 41 wound in a substantially oblong shape, the effect of the substantially oblong coil described above can be obtained by making radius R of a curve at each of the four corners an amount that corresponds to a proportion of 5 to 30% relative to the edge width (either one of a short side and a long side) of the substantially oblong hollow portion. Note that, in the present embodiment, with respect to the four corners at the innermost end (hollow portion) of charging coil 41, R is 2 mm, and a preferable value for R is between 0.5 mm and 4 mm.

Further, when winding charging coil 41 in a rectangular shape, preferably, leg portions 432a and 432b are provided in the vicinity of corner portions 431a to 431d. When charging coil 41 is wound in a circular shape, irrespective of where leg portions 432a and 432b are provided, leg portions 432a and 432b can be provided at a portion at which a planar coil portion is wound in a curve. When the conducting wire is wound in a curved shape, a force acts that tries to maintain the curved shape thereof, and it is difficult for the overall shape to be broken even if leg portions 32a and 32b are formed. In contrast, in the case of a coil in which the conducting wire is wound in a rectangular shape, there is a difference in the force with which the coil tries to maintain the shape of the coil itself with respect to side portions (linear portions) and corner portions. That is, at corner portions 431a to 431d in FIG. 4B, a large force acts to try to maintain the shape of charging coil 41. However, at each side portion, a force that acts to try to maintain the shape of charging coil 41 is small, and the conducting wire is liable to become uncoiled from charging coil 41 in a manner in which the conducting wire pivots around the curves at corner portions 431a to 431d. As a result, the number of turns of charging coil 41 fluctuates by, for example, about ⅛ turn, and the L value of charging coil 41 fluctuates. That is, the L value of charging coil 41 varies. Accordingly, it is favorable for winding start point 432aa and winding end point 432bb of the conducting wire which is wound a plurality of times until winding end point 432bb is formed to be adjacent to corner portions 431a to 431d. At this time, the conducting wire is bent to a larger degree in a gradual manner at winding end point 432bb compared to winding start point 432aa. This is done to enhance a force that tries to maintain the shape of leg portion 432b.

If the conducting wire is a litz wire, a force that tries to maintain the shape of charging coil 41 is further enhanced. In the case of a litz wire, since the surface area per wire is large, if an adhesive or the like is used to fix the shape of charging coil 41, it is easy to fix the shape thereof. In contrast, if the conducting wire is a single wire, because the surface area per conducting wire decreases, the surface area to be adhered decreases and the shape of charging coil 41 is liable to become uncoiled.

According to the present embodiment charging coil 41 is formed using a conducting wire having a circular sectional shape, but a conducting wire having a square sectional shape may be used as well. In the case of using a conducting wire having a circular sectional shape, since gaps arise between adjacent conducting wires, stray capacitance between the conducting wires decreases and the alternating-current resistance of charging coil 41 can be suppressed to a small amount.

[Regarding NFC Coil]

NFC coil 43 according to the present embodiment that is illustrated in FIG. 4C is an antenna that carries out short-range wireless communication which performs communication by electromagnetic induction using the 13.56 MHz frequency, and a sheet antenna is generally used therefor.

NFC coil 43 includes second magnetic sheet 45 having a ferrite magnetic body as a principal component, protective members between which the magnetic sheet is interposed, a matching circuit, a terminal connection section, a substrate, a chip capacitor for matching and the like. NFC coil 43 may be housed in a radio communication medium such as an IC card or IC tag, or may be housed in a radio communication medium processing apparatus such as a reader or a reader/writer.

NFC coil 43 in an antenna pattern that is formed with a spiral-shaped conductive material (that is, is formed by winding a conducting wire). The spiral structure may be a spiral shape that has an open portion at the center, and the shape thereof may any one of a circular shape, a substantially rectangular shape, a substantially square shape, and a polygonal shape. In the present embodiment, NFC coil 43 is a rectangular shape, and particularly is a square shape. Adopting a spiral structure causes a sufficient magnetic field to be generated and enables communication by generation of inductive power and mutual inductance.

Further, since a circuit can be formed directly on the surface of or inside second magnetic sheet 45, it is possible to form NFC coil 43, matching circuit, and terminal connection section directly on second magnetic sheet 45.

The matching circuit is constituted by a chip capacitor that is mounted so as to form a bridge with an electric conductor of NFC coil 43 that is formed on a substrate, and therefore the matching circuit can be formed on the NFC coil.

Connecting the matching circuit with the coil forms NFC coil 43 in which the resonance frequency of the antenna is adjusted to a desired frequency, which suppresses the occurrence of standing waves due to mismatching, and which operates stably with little loss. The chip capacitor used as a matching element is mounted so as to form a bridge with the electric conductor of NFC coil 43.

The substrate can be formed of a polyimide, PET, a glass-epoxy substrate, an FPC substrate or the like. By using a polyimide or PET or the like, NFC coil 43 that is thin and flexible can be formed by printing or the like. According to the present embodiment, the substrate is constituted by an FPC substrate having a thickness of 0.2 mm.

Note that the above described NFC coil 43 is merely an example, and the present invention is not limited to the above described configuration or materials and the like.

NFC coil 43 can be formed in a thin condition by forming a conducting wire on a substrate by pattern printing. Unlike charging coil 41, the amount of current during communication is extremely small, so that NFC coil 43 can be formed by pattern printing. The current is approximately 0.2 A to 0.4 A. The width of NFC coil 43 is between 0.1 mm and 1 mm, and the thickness is between 15 µm and 35 µm. In the present embodiment the conducting wire of NFC coil 43 is wound for four turns, and the number of turns may be from two to six. The length of the sides of the outer shape of NFC coil 43 is approximately 39 mm×39 mm (a preferable length of one side is between 30 mm and 60 mm), and the size of the substrate is approximately 39.6 mm×39.6 mm (a preferable length of one side is between 30 mm and 60 m). In a case where NFC coil 43 is wound in an oblong shape, with respect to the outer diameter of the substrate and NFC coil 43, preferably the length of a long side is between 40 mm and 60 mm and the length of a short side is between 30 mm and 50 mm. Further, with respect to the four corners, R is between 0.1 mm and 0.3 mm at the innermost edge of NFC coil 43 and R is between 0.2 mm and 0.4 mm at the outermost edge thereof, and the four corners of the outermost edge necessarily curve more gradually than the four corners at the innermost edge.

[Regarding First Magnetic Sheet]

First magnetic sheet 44 includes flat portion 44A on which charging coil 41 and second magnetic sheet 45 are mounted, center portion 44B that is substantially the center portion of flat portion 44A and that corresponds (faces) to the inside of the hollow region of charging coil 41, and slit 48 into which at least a part of the two leg portions 432a and 432b of charging coil 41 is inserted. Slit 48 is not limited to a slit shape that penetrates through first magnetic sheet 44 as shown in FIG. 4D, and may be formed in the shape of a recessed portion that does not penetrate therethrough. Forming slit 48 in a slit shape facilitates manufacture and makes it possible to securely house the conducting wire. On the other hand, forming slit 48 in the shape of a recessed portion makes it possible to increase the volume of first magnetic sheet 44, and it is thereby possible to improve the L value of charging coil 41 and the transmission efficiency. Center portion 44B may be formed in a shape that, with respect to flat portion 12, is any one of a protruding portion shape, a flat shape, a recessed portion shape, and the shape of a through-hole. If center portion 44B is formed as a protruding portion, the magnetic flux of charging coil 41 can be strengthened. If center portion 44B is flat, manufacturing is facilitated and charging coil 41 can be easily mounted thereon, and furthermore, a balance can be achieved between the influence of an aligning magnet and the L value of charging coil 41 that is described later. A detailed description with respect to a recessed portion shape and a through-hole is described later.

A Ni—Zn ferrite sheet, a Mn—Zn ferrite sheet, or a Mg—Zn ferrite sheet or the like can be used as first magnetic sheet 44. First magnetic sheet 44 may be configured as a single layer, may be configured by stacking a plurality of sheets made of the same material in the thickness direction, or may be configured by stacking a plurality of different magnetic sheets in the thickness direction. It is preferable that, at least, the magnetic permeability of first magnetic sheet 44 is 250 or more and the saturation magnetic flux density thereof is 350 mT or more.

An amorphous metal can also be used as first magnetic sheet 44. The use of ferrite sheet (sintered body) as first magnetic sheet 44 is advantageous in that the alternating-current resistance of charging coil 41 can be reduced, while the use of amorphous metal as the magnetic sheet is advantageous in that the thickness of charging coil 41 can be reduced.

First magnetic sheet 44 is substantially square within a size of approximately 40×40 mm (from 35 mm to 50 mm), and is formed in a size that is equal to or somewhat larger than the size of the substrate of NFC coil 43. In a case where first magnetic sheet 44 is a substantially oblong shape, a short side thereof is 35 mm (from 25 mm to 45 mm) and a long side is 45 mm (from 35 mm to 55 mm). The thickness thereof is 0.43 mm (in practice, between 0.4 mm and 0.55 mm, and preferably between 0.3 mm and 0.7 mm). It is desirable to form first magnetic sheet 44 in a size that is equal to or larger than the size of the outer circumferential edge of second magnetic sheet 45. First magnetic sheet 44 may be a circular shape, a rectangular shape, a polygonal shape, or a rectangular and polygonal shape having large curves at four corners.

Also, the secondary-side non-contact charging module 20 includes a charging coil 41 that includes a wound conducting wire 42 and a NFC coil 43 that is disposed so as to surround charging coil 41. Also, the secondary-side non-contact charging module 20 includes a first magnetic sheet 44 that supports the charging coil 41 and a second magnetic sheet 45 that is placed the NFC coil 43 from the same direction and a slit 48 provided on the first magnetic sheet 44. The leg portions 432a and 432b are housed in the slit 48.

Slit 48 illustrated in FIG. 4D houses the conducting wire of at least a part of each of the two leg portions 432a and 432b that extend from winding start point 432aa (innermost portion of coil) and winding end point 432bb (outermost edge of coil) of charging coil 41 to lower edge 414 of first magnetic sheet 44. Thus, slit 48 prevents the conducting wire from winding start point 32aa of the coil to leg portion 32a overlapping in the stacking direction at a planar winding portion of charging coil 41. In addition, slit 48 prevents leg portions 432a and 432b overlapping in the stacking direction of NFC coil 43 and thereby increasing the thickness of secondary-side non-contact charging module 20.

Slit 48 is formed so that one end thereof is substantially perpendicular to an end (edge) of first magnetic sheet 44 that intersects therewith, and so as to contact center portion 44B of first magnetic sheet 44. In a case where charging coil 41 is circular, by forming slit 48 so as to overlap with a tangent of center portion 44B (circular), leg portions 432*a* and 432*b* can be formed without bending a winding start portion of the conducting wire. In a case where charging coil 41 is a substantially rectangular shape, by forming slit 48 so as to overlap with an extension line of a side of center portion 44B (having a substantially rectangular shape), leg portions 432*a* and 432*b* can be formed without bending the winding start portion of the conducting wire. The length of slit 48 depends on the inner diameter of charging coil 41 and the size of first magnetic sheet 44. In the present embodiment, the length of slit 48 is between approximately 15 mm and 30 mm.

Slit 48 may also be formed at a portion at which an end (edge) of first magnetic sheet 44 and center portion 44B are closest to each other. That is, when charging coil 41 is circular, slit 48 is formed to be perpendicular to the end (edge) of first magnetic sheet 44 and a tangent of center portion 44B (circular), and is formed as a short slit. Further, when charging coil 41 is substantially rectangular, slit 48 is formed to be perpendicular to an end (edge) of first magnetic sheet 44 and a side of center portion 44B (substantially rectangular), and is formed as a short slit. It is thereby possible to minimize the area in which slit 48 is formed and to improve the transmission efficiency of a non-contact power transmission device. Note that, in this case, the length of slit 48 is approximately 5 mm to 20 mm. In both of these configurations, the inner side end of the linear recessed portion or slit 48 is connected to center portion 44B.

Next, adverse effects on first magnetic sheet 44 produced by the magnet for alignment described in the foregoing are described. As described above, when magnet 220 is provided in primary-side non-contact charging module 200 for alignment, due to the influence of magnet 220, the magnetic permeability of first magnetic sheet 44 decreases at a portion that is close to magnet 220 in particular. Accordingly, the L value of charging coil 41 varies significantly between a case where magnet 220 for alignment is provided in primary-side non-contact charging module 200 and a case where magnet 220 is not provided. It is therefore necessary to provide the magnetic sheet such that the L value of charging coil 41 changes as little as possible between a case where magnet 220 is close thereto and a case where magnet 220 is not close thereto.

When the electronic device in which non-contact charging module is mounted is a mobile phone, in many cases non-contact charging module is disposed between the case constituting the exterior package of the mobile phone and a battery pack located inside the mobile phone, or between the case and a substrate located inside the case. In general, since the battery pack is a casing made of aluminum, the battery pack adversely affects power transmission. This is because an eddy current is generated in the aluminum in a direction that weakens the magnetic flux generated by the coil, and therefore the magnetic flux of the coil is weakened. For this reason, it is necessary to alleviate the influence with respect to the aluminum by providing first magnetic sheet 44 between the aluminum which is the exterior package of the battery pack and charging coil 41 disposed on the exterior package thereof. Further, there is a possibility that an electronic component mounted on the substrate will interfere with power transmission of charging coil 41, and the electronic component and charging coil 41 will exert adverse effects on each other. Consequently, it is necessary to provide a magnetic sheet or a metal film between the substrate and charging coil 41, and suppress the mutual influences of the substrate and charging coil 41.

In consideration of the above described points, it is important that first magnetic sheet 44 that is used in non-contact charging module 100 has a high level of magnetic permeability and a high saturation magnetic flux density so that the L value of charging coil 41 is made as large as possible. It is sufficient if the magnetic permeability of first magnetic sheet 44 is 250 or more and the saturation magnetic flux density thereof is 350 mT or more. In the present embodiment, first magnetic sheet 44 is a Mn—Zn ferrite sintered body having a magnetic permeability between 1,500 and 2,500, a saturation magnetic flux density between 400 and 500, and a thickness between approximately 400 μm and 700 μm. However, first magnetic sheet 44 may be made of Ni—Zn ferrite, and favorable power transmission can be performed with primary-side non-contact charging module 200 as long as the magnetic permeability thereof is 250 or more and the saturation magnetic flux density is 350 or more.

Charging coil 41 forms an LC resonance circuit through the use of a resonant capacitor. At such time, if the L value of charging coil 41 varies significantly between a case where magnet 220 provided in primary-side non-contact charging module 200 is utilized for alignment and a case where magnet 220 is not utilized, a resonance frequency with the resonant capacitor will also vary significantly. Since the resonance frequency is used for power transmission (charging) between primary-side non-contact charging module 200 and non-contact charging module 100, if the resonance frequency varies significantly depending on the presence/absence of magnet 220, it will not be possible to perform power transmission correctly. However, by adopting the above described configuration, variations in the resonance frequency that are caused by the presence/absence of magnet 220 are suppressed, and highly efficient power transmission is performed in all situations.

A further reduction in thickness is enabled by using a Mn—Zn ferrite sheet as the ferrite sheet. That is, the frequency of electromagnetic induction is defined by the standard (WPC) as a frequency between approximately 100 kHz and 200 kHz (for example, 120 kHz). A Mn—Zn ferrite sheet provides a high level of efficiency in this low frequency band. Note that a Ni—Zn ferrite sheet provides a high level of efficiency at a high frequency. Accordingly, in the present embodiment, first magnetic sheet 44 that is used for non-contact charging for performing power transmission at a frequency between approximately 100 kHz and 200 kHz is constituted by a Mn—Zn ferrite sheet, and second magnetic sheet 45 that is used for NFC communication in which communication is performed at a frequency of approximately 13.56 MHz is constituted by a Ni—Zn ferrite sheet.

A hole may be formed at the center of center portion 44B of first magnetic sheet 44. Note that, the term "hole" may refer to either of a through-hole and a recessed portion. Although the hole may be larger or smaller than center portion 44B, it is favorable to form a hole that is smaller than center portion 44B. That is, when charging coil 41 is mounted on the first magnetic sheet, the hole may be larger or smaller than the hollow portion of charging coil 41. If the hole is smaller than the hollow portion of charging coil 41, all of charging coil 41 will be mounted on first magnetic sheet 44.

As described in the foregoing, non-contact charging module is configured to be adaptable to both a primary-side (charging-side) non-contact charging module 200 that uses a magnet and primary-side non-contact charging module 200 that does not use a magnet. Thus, charging can be performed regardless of the type of primary-side non-contact charging module 200 and convenience is thereby improved. There is a demand to make the L value of charging coil 41 in a case where magnet 220 is provided in primary-side non-contact charging module 200 and the L value of charging coil 41 in a case where magnet 220 is not provided therein close to each other, and to also improve both L values. In addition, when magnet 220 is disposed in the vicinity of first magnetic sheet 44, the magnetic permeability of center portion 44B of first magnetic sheet 44 that is in the vicinity of magnet 220 decreases. Therefore, a decrease in the magnetic permeability can be suppressed by providing the hole in center portion 44B.

Figure 7:
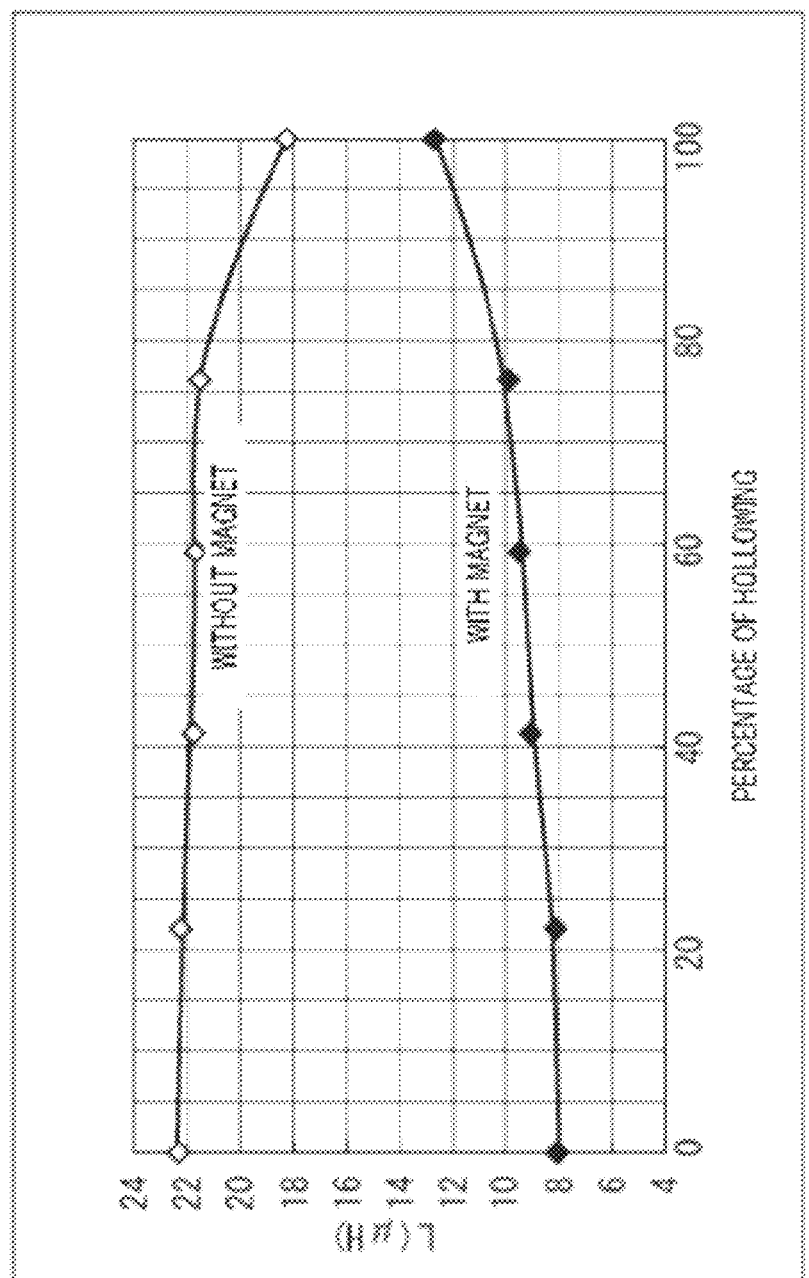
FIG. 7 illustrates a relation between an L value of a charging coil and a percentage of hollowing of a center portion with respect to a case where a magnet is provided in a primary-side non-contact charging module and a case where a magnet is not provided therein.

FIG. 7 illustrates a relation between an L value of a charging coil in a case where a magnet is provided in the primary-side non-contact charging module and a case where a magnet is not provided, and the percentage of hollowing of the center portion. Note that a percentage of hollowing of 100% means that the hole in center portion 44B is a through-hole, and a percentage of hollowing of 0% means that a hole is not provided. Further, a percentage of hollowing of 50% means that, for example, a hole (recessed portion) of a depth of 0.3 mm is provided with respect to a magnetic sheet having a thickness of 0.6 mm.

As shown in FIG. 7, in the case where magnet 220 is not provided in primary-side non-contact charging module 200, the L value decreases as the percentage of hollowing increases. At such time, although the L value decreases very little when the percentage of hollowing is from 0% to 75%, the L value decreases significantly when the percentage of hollowing is between 75% and 100%. In contrast, when magnet 220 is provided in primary-side non-contact charging module 200, the L value rises as the percentage of hollowing increases. This is because the charging coil is less liable to be adversely affected by the magnet. At such time, the L value gradually rises when the percentage of hollowing is between 0% and 75%, and rises significantly when the percentage of hollowing is between 75% and 100%.

Accordingly, when the percentage of hollowing is between 0% and 75%, while maintaining the L value in a case where magnet 220 is not provided in primary-side non-contact charging module 200, the L value in a case where magnet 220 is provided in primary-side non-contact charging module 200 can be increased. Further, when the percentage of hollowing is between 75% and 100%, the L value in a case where magnet 220 is not provided in primary-side non-contact charging module 200 and the L value in a case where magnet 220 is provided in primary-side non-contact charging module 200 can be brought significantly close to each other. The greatest effect is achieved when the percentage of hollowing is between 40 and 60%. Magnet 220 and the first magnetic sheet can adequately attract each other when magnet 220 is provided and the L value of a case where magnet 220 is provided in primary-side non-contact charging module 200 is increased to 1 µH or more while the L value of a case where no magnet 220 is provided in primary-side non-contact charging module 200 is maintained.

[Regarding Second Magnetic Sheet]

Second magnetic sheet 45 illustrated in FIG. 4E is constituted by a metal material such as ferrite, permalloy, sendust or a silicon steel sheet. Ni-based soft magnetic ferrite is preferable as second magnetic sheet 45. Second magnetic sheet 45 can be made by molding ferrite fine particles using a dry pressing method, and sintering the molded ferrite to form a ferrite sintered body having high density. It is preferable that the density of the soft magnetic ferrite is 3.5 g/cm$^3$ or more. Moreover, it is preferable that the size of the magnetic body made of the soft magnetic ferrite is greater than or equal to a crystal grain boundary. Second magnetic sheet 45 is a sheet-like (or a plate-like, film-like, or layer-like) magnetic sheet that is formed to a thickness between approximately 0.07 mm and 0.5 mm. The size of the outer shape of second magnetic sheet 45 is approximately the same as the outer shape of NFC coil 43. However, it is advantageous to make the outer shape of second magnetic sheet 45 approximately 1 to 3 mm larger than the outer shape of NFC coil 43. The thickness of second magnetic sheet 45 is 0.1 mm, which is half the thickness or less of first magnetic sheet 44. The magnetic permeability is at least 100 to 200.

A protective member that is adhered to the upper and lower faces (front and rear faces) of first magnetic sheet 44 and second magnetic sheet 45 may be manufactured by employing at least one means selected from a resin, an ultraviolet curable resin, a visible light-curable resin, a thermoplastic resin, a thermosetting resin, a heat-resistant resin, synthetic rubber, a double coated tape, an adhesive layer, and a film, and such means may be selected by considering not only flexibility with respect to bends and flexures and the like of NFC coil 43, but also heat resistance and moisture resistance and the like. Further, one face, both faces, one side-face, both side-faces, or all faces of NFC coil 43 may be coated with the protective member. In particular, in the present embodiment, flexibility is provided by previously crushing first magnetic sheet 44 and second magnetic sheet 45 into small pieces. Therefore, it is useful to provide a protective sheet so that the large number of small pieces that are arranged in a sheet shape do not become scattered.

[Regarding Configuration of Non-Contact Charging Module]

Figure 8A:
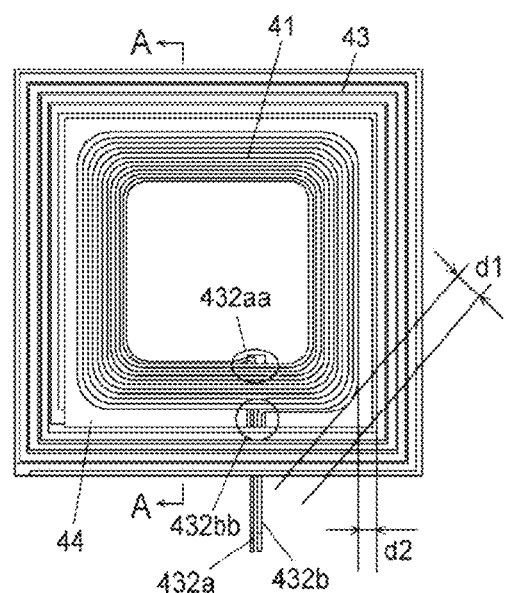
FIGS. 8A to 8D illustrate a secondary-side non-contact charging module according to a first embodiment.
Figure 8B:
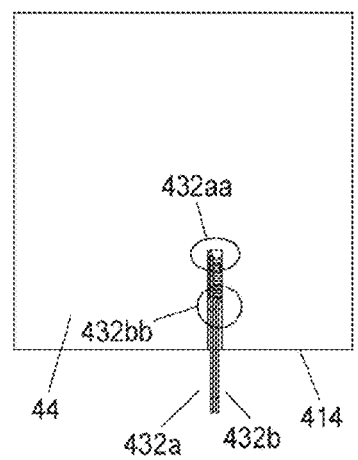
Figure 8C:
Figure 8D:
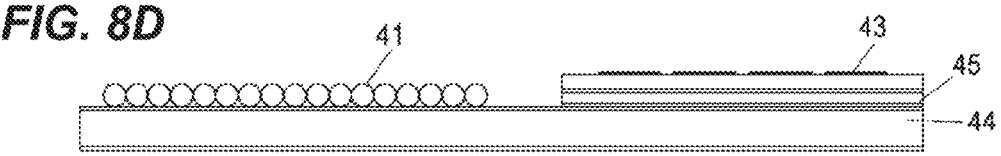

FIGS. 8A to 8D illustrate the secondary-side non-contact charging module according to the present embodiment. FIG. 8A is a top view of the secondary-side non-contact charging module. FIG. 8B is a bottom view of the secondary-side non-contact charging module. FIG. 8C is a sectional view along a line A-A in FIG. 8A. FIG. 8D is an enlarged sectional view of an area on the right side of line B-B' in FIG. 8C.

When the power reception direction of charging coil 41 and the communication direction of NFC coil 43 are made the same direction and charging coil 41 and NFC coil 43 are brought close together, simply disposing charging coil 41 and NFC coil 43 results in a situation where the mutual presence of charging coil 41 and NFC coil 43 reduces the power transmission efficiency of the counterpart. That is, at a time of non-contact charging, there is a possibility that magnetic flux generated by primary-side non-contact charging module 200 will be received as transmitted electricity by NFC coil 43, and consequently the power of the electricity received by charging coil 41 will decrease. Consequently, there is a possibility that the power transmission efficiency will decrease. Further, as far as NFC coil 43 is concerned, the magnetic flux that primary-side non-contact charging module 200 generates is extremely large, and is generated for a long time period. Accordingly, there is a possibility that a current that is too large for NFC coil 43 will arise in NFC coil 43, and there are cases where such a current causes adverse effects on NFC coil 43. On the other hand, when NFC coil 43 communicates, an eddy current is generated in charging coil 41 and interferes with the communication of NFC coil 43. That is, because of differences in the size of the power that is transmitted, the diameter of the conducting wire, the number of turns, and the overall size are larger in charging coil 41 than in NFC coil 43. Consequently, from the viewpoint of NFC coil 43, charging coil 41 is a large metal body. A magnetic flux that attempts to cancel out a magnetic flux emitted during communication by NFC coil 43 flows through charging coil 41, and significantly reduces the communication efficiency of NFC coil 43.

Therefore, in the present embodiment, NFC coil 43 is disposed around the circumference of charging coil 41. Consequently, when performing non-contact charging, it is difficult for NFC coil 43 to receive electricity from magnetic flux that primary-side non-contact charging module 200 generates since NFC coil 43 is positioned at a location that is separated from primary-side non-contact charging module 200, and it is difficult for NFC coil 43 to take power that should be received by charging coil 41. As a result, a decrease in the power transmission efficiency can be suppressed. Conversely, in a case where NFC coil 43 is disposed inside a hollow portion of charging coil 41, since NFC coil 43 receives all of the magnetic flux at a time of non-contact charging, NFC coil 43 takes a lot of power that should be received by charging coil 41. Note that, even if charging coil 41 receives magnetic flux during communication by NFC coil 43, the magnetic flux has no influence on charging coil 41 because the magnetic flux and current are extremely small as far as charging coil 41 is concerned. That is, although charging coil 41 generates an eddy current with respect to NFC coil 43, since the eddy current of charging coil 41 does not flow in NFC coil 43 to a degree that influences NFC coil 43, NFC coil 43 is placed on the outer side of charging coil 41 and the opening area is made large to thereby improve the communication efficiency of NFC coil 43.

Further, when NFC coil 43 communicates, since charging coil 41 is disposed on the inner side thereof, the region of charging coil 41 that is adjacent to NFC coil 43 is small relative to the size of NFC coil 43. As a result, it is difficult for an eddy current to arise in charging coil 41. Conversely, if charging coil 41 is disposed on the outer side, charging coil 41 will be larger than the small NFC coil 43, and as a result the region of charging coil 41 that is adjacent to NFC coil 43 will be relatively larger. Therefore, an eddy current that arises in charging coil 41 will be extremely large as far as NFC coil 43 is concerned, and the communication of NFC coil 43 will be significantly interfered with. Note that, even if an eddy current arises in NFC coil 43 during non-contact charging, the eddy current will be small as far as charging coil 41 is concerned and will therefore not affect charging coil 41.

First magnetic sheet 44 has a frequency characteristic that can improve power transmission of electromagnetic induction between approximately 100 and 200 kHz that performs non-contact charging. However, when there is a peak at approximately 100 to 200 kHz, communication of NFC coil 43 can also be improved at the 13.56 MHz band at which NFC communication is performed. On the other hand, second magnetic sheet 45 has a frequency characteristic that can improve communication of electromagnetic induction at a frequency of approximately 13.56 MHz at which NFC coil 43 performs communication. However, when there is a peak at approximately 13.56 MHz, there is almost no influence on the efficiency of non-contact charging in a band of approximately 100 to 200 kHz at which non-contact charging is performed.

With respect to NFC coil 43 and charging coil 41, by disposing charging coil 41 at a hollow position (a hollow portion and a lower part of the hollow portion) of NFC coil 43, first magnetic sheet 44 can be utilized to improve the communication of NFC coil 43. That is, while achieving a reduction in size by modularization of first magnetic sheet 44, second magnetic sheet 45, charging coil 41, and NFC coil 43, first magnetic sheet 44 can also be utilized for a different purpose (improving the efficiency of NFC coil 43) than the original purpose thereof (improving the efficiency of charging coil 41), and thus first magnetic sheet 44 can be efficiently utilized.

As a result, an induction voltage when a magnetic flux was received from the same NFC reader/writer changed as described below. For example, whereas the induction voltage was 1,573 mV in a case where NFC coil 43 was placed on a magnetic sheet having a through-hole in a region corresponding to a hollow portion of NFC coil 43, the induction voltage was 1,712 mV in the case of non-contact charging module 100 illustrated in FIG. 7A. The reason for this was that first magnetic sheet 44 improved the communication efficiency of NFC coil 43.

Furthermore, as shown in FIG. 8A, distance d1 between corner portions 441a to 441d at the four corners of the substantially square NFC coil 43 and corner portions 431a to 431d at the four corners of the substantially square charging coil 41 is wider than distance d2 between other portions (between the respective sides). That is, although distance d2 between a side portion of NFC coil 43 and a side portion of charging coil 41 that are adjacent is narrow, distance d1 between corner portions 441a to 441d and corner portions 431a to 431d is large. The reason is that, in comparison to corner portions 441a to 441d of NFC coil 43, corner portions 431a to 431d of charging coil 41 curve gradually (have a large R) and thereby shift inward.

Further, in the case of charging coil 41 and NFC coil 43 that have a substantially rectangular shape, magnetic flux concentrates at corner portions 431a to 431d and corner portions 441a to 441d thereof. Therefore, if distance d1 between corner portions 431a to 431d and corner portions 441a to 441d is large, it is possible to suppress the occurrence of a situation in which the respective magnetic fluxes are taken by the other coil. That is, by causing the outermost edges of corner portions 431a to 431d of charging coil 41 to curve more gradually (by setting R to a large value) than the innermost edges of corner portions 441a to 441d of NFC coil 43, distance d1 between corner portions 441a to 441d and corner portions 431a to 431d that are facing can be made larger than distance d2 between side portions that are facing. Consequently, non-contact charging module 100 can be reduced in size by bringing the side portions at which the magnetic flux does not concentrate close to each other, and the respective communication (power transmission) efficiencies of the charging coil 41 and NFC coil 43 can be improved by separating the respective corner portions thereof. Note that, R of corner portions 431a to 431d of charging coil 41 is approximately 2 mm with respect to the innermost edge (hollow portion) and is approximately 5 mm to 15 mm with respect to the outermost edge, and R of corner portions 441a to 441d of NFC coil 43 is approximately 0.1 mm with respect to the innermost edge (hollow portion) and is approximately 0.2 mm with respect to the outermost edge. Further, in the present embodiment, distance d1 between corner portions 431a to 431d and corner portions 441a to 441d is 2 mm, and may be approximately 1.5 mm to 10 mm, and distance d2 between facing side portion is 1 mm, and may be approximately 0.5 mm to 3 mm. Further, preferably, by making d1 a distance that is between three and seven times greater than d2, a favorable balance can be achieved between a reduction in size, improvement of power transmission efficiency, and improvement of communication efficiency.

By forming charging coil 41 as a rectangle, although charging coil 41 comes close to NFC coil 43 at the side portions of the rectangular portion, a wide opening area can be secured. In contrast, if charging coil 41 is wound in a circular shape, the portions that come close to (portions closest to) NFC coil 43 are points, and not sides, and hence mutual interference therebetween can be mitigated. That is, a distance between the four corners of NFC coil 43 and the four corners of charging coil 41 increases. As a result, the distance between charging coil 41 and the four corners at which the magnetic flux concentrates most in NFC coil 43 increases, and thus the communication efficiency of NFC coil 43 can be improved. In addition, by forming charging coil 41 in a circular shape, regardless of what direction charging coil 41 and primary-side coil 210 of primary-side non-contact charging module 200 face each other, charging can be performed without being influenced by the direction.

Further, since charging coil 41 is disposed in a hollow portion of NFC coil 43, leg portions 432a and 432b and NFC coil 43 are stacked, so that the thickness of secondary-side non-contact charging module 20 increases. In particular, since charging coil 41 is considerably thick in the thickness direction compared NFC coil 43, the thickness of secondary-side non-contact charging module 20 will become extremely thick if leg portion 432a and leg portion 432b of charging coil 41 are stacked on another portion of secondary-side non-contact charging module 20. Therefore, both of leg portions 32a and 32b are housed in slit 48 of first magnetic sheet 44. At least a part of leg portion 432a that connects to winding start (inner side) point 432aa of the winding portion (planar coil portion) of charging coil 41 is stacked with both the winding portion (planar coil portion) of charging coil 41 and NFC coil 43. Further, at least a part of leg portion 432b that connects to winding end (outer side) point 432bb of the winding portion (planar coil portion) of charging coil 41 is stacked with NFC coil 43. Therefore, slit 48 is extended from lower edge 414 shown in FIG. 8B to at least winding start (inner side) point 432bb of the winding portion (planar coil portion) of charging coil 41. A portion of leg portion 432a that is stacked with the winding portion (planar coil portion) of charging coil 41 and the NFC coil 43 is housed in slit 48. Further, a portion of leg portion 432b that is stacked with the NFC 43 coil is housed in slit 48. It is thereby possible to prevent a situation where the thickness increases at a portion at which conducting wires are stacked together by storing both of leg portions 432a and 432b in slit 48. Also, because NFC coil 43 and charging coil 31 are in rectangular shape, slit 48 is perpendicular to straight portions of NFC coil 43 and charging coil 41. Thus, slit 48 can be formed shortly, and the power transmission efficiency of charging coil 41 and the communication efficiency of NFC coil 43 are improved.

As described above, slit 48 may be a penetrating slit or may be a slit formed as a recessed portion having a bottom. It is sufficient to at least form slit 48 to be deeper than the diameter of the conducting wire of charging coil 41. The lateral width (width in the short-side direction) of slit 48 is 5 mm, and a preferable lateral width is between 2 mm and 10 mm. In the present embodiment, a minimum necessary width for housing both of leg portions 32a and 32b is 2 mm. The lateral width of slit 48 is preferably an amount that is from two to five times greater than the amount of a diameter that corresponds to twice the diameter of the conducting wire of charging coil 41. That is, it is preferable that, even if the conducting wire is formed of a plurality of wires such as in the case of a litz wire, slit 48 has a width such that around four terminals of charging coil 41 can be housed therein. If the width of slit 48 is made larger than that, the power transmission efficiency of charging coil 41 will decrease. The reason the width is set to twice or more the minimum required width is to provide a gap between leg portions 432a and 432b. It is thereby possible to reduce stray capacitance between leg portion 432a and leg portion 432b. As a result, the efficiency of charging coil 41 can be improved. Further, it is easy to house leg portions 432a and 432b inside slit 48, and the strength of leg portions 32a and 32b can be improved.

By housing both of leg portions 32a and 32b inside a single slit 48, it is possible to suppress to the minimum the area removed from first magnetic sheet 44 to form a slit. However, a plurality of slits 11 may also be provided depending on the direction in which leg portions 432a and 432b extend. That is, slit 48 that houses leg portion 432a that connects with winding start (inner side) point 432aa of the winding portion (planar coil portion) of charging coil 41 is extended from lower edge 414 to at least winding start (inner side) point 432aa of the winding portion (planar coil portion) of charging coil 41. The portion of leg portion 432a that is stacked with the winding portion (planar coil portion) of charging coil 41 and NFC coil 43 is housed in slit 48. On the other hand, a slit that houses leg portion 432b that connects with winding end (outer side) point 432bb of the winding portion (planar coil portion) of charging coil 41 is extended from lower edge 414 to at least winding end (outer side) point 432bb of the winding portion (planar coil portion) of charging coil 41. The portion of leg portion 432b that is stacked with NFC coil 43 is housed in slit 48. By providing two slits and housing leg portion 432a and leg portion 432b in one slit each in this manner, the generation of stray capacitance between leg portions 432a and 432b can be avoided. The direction in which to draw out leg portion 432a and leg portion 432b can be freely set. In the case of forming two slits that house only one conducting wire each, each slit is approximately 0.5 mm.

A configuration may be adopted in which a first slit is formed at only a portion at which leg portion 432a is stacked with the winding portion (planar coil portion) of charging coil 41, and a second slit that houses leg portion 432a and leg portion 432b is formed at a portion at which leg portion 432a and leg portion 432b are stacked with NFC coil 43. That is, slit 48 may be formed in any shape, and the important point is that both of leg portion 432a and leg portion 432b are housed in slit 48.

Slit 48 may also be formed in an L shape as shown in FIG. 9. FIG. 9 is a schematic diagram illustrating a first magnetic sheet having an L-shaped slit according to the present embodiment. In the L-shaped slit (hereunder, referred to as "slit 48a") shown in FIG. 9, region x corresponds to slit 48 shown in FIG. 4D and houses leg portions 432a and 432b. The reason that slit 48a is enlarged as far as region y and region z is that, as described in the foregoing, the conducting wire shown in FIG. 4B is formed to curve more gradually and to a greater degree at winding end point 431bb than at winding start point 431aa. Because the conducting wire curves gradually at winding end point 432bb, slit 48a is enlarged as far as region y to house the curved portion. It is not necessary to enlarge slit 48a as far as region z. However, in the present embodiment, because first magnetic sheet 44 is constituted by a ferrite sheet (sintered body), if region z is left as a part of first magnetic sheet 44 and is not made a part of slit 48a, the portion of the sheet at region z will be damaged. Therefore, slit 48a is formed as far as region z to prevent damaging of first magnetic sheet 44 and stabilize the characteristics of first magnetic sheet 44. Note that, if first magnetic sheet 44 is damaged, the characteristics of first magnetic sheet 44 will change significantly, and the characteristics of charging coil 41 will also change significantly. For example, the L value will decrease and the power transmission efficiency of non-contact charging will decrease. FIG. 9 illustrates that the first magnetic sheet 44 has four edges 44a-44d that collectively define a rectangular profile of the magnetic sheet 44, wherein at most three pairs of adjacent edges respectively meet to form at most three corners 46a-46c. As illustrated, adjacent edges 44a and 44b meet to form a corner 46a, adjacent edges 44b and 44c meet to form a corner 46b, and adjacent edges 44c and 44d meet to form a corner 46c, while adjacent edges 44a and 44d do not meet each other and do not form a corner. Still referring to FIG. 9, the magnetic sheet 44 has a rectangular shape including four edges 44a-44d and four corner portions 46a-46d. Each pair of adjacent edges forms a virtual corner 46a'-46d', and each corner portion (46a-46d) is receded inwardly from its corresponding virtual corner (46a'-46d') by a receding distance. At least one of four receding distances (e.g., distance 46d'-46d) is greater than another one of the four receding distances (e.g., distance 46a'-46a). Still referring to FIG. 9, the magnetic sheet 44 includes four sides 44a-44d that collectively define a rectangular profile of the magnetic sheet 44. The four sides 44a-44d consist of a first side 44b and a second side 44d in parallel to each other, and a third side 44c and a fourth side 44a in parallel to each other. The third side 44c is interposed between the first side 44b and the second side 44d. The first side 44b is longer than the second side 44d, and the third side 44c is longer than the fourth side 44a.

Figure 10A:
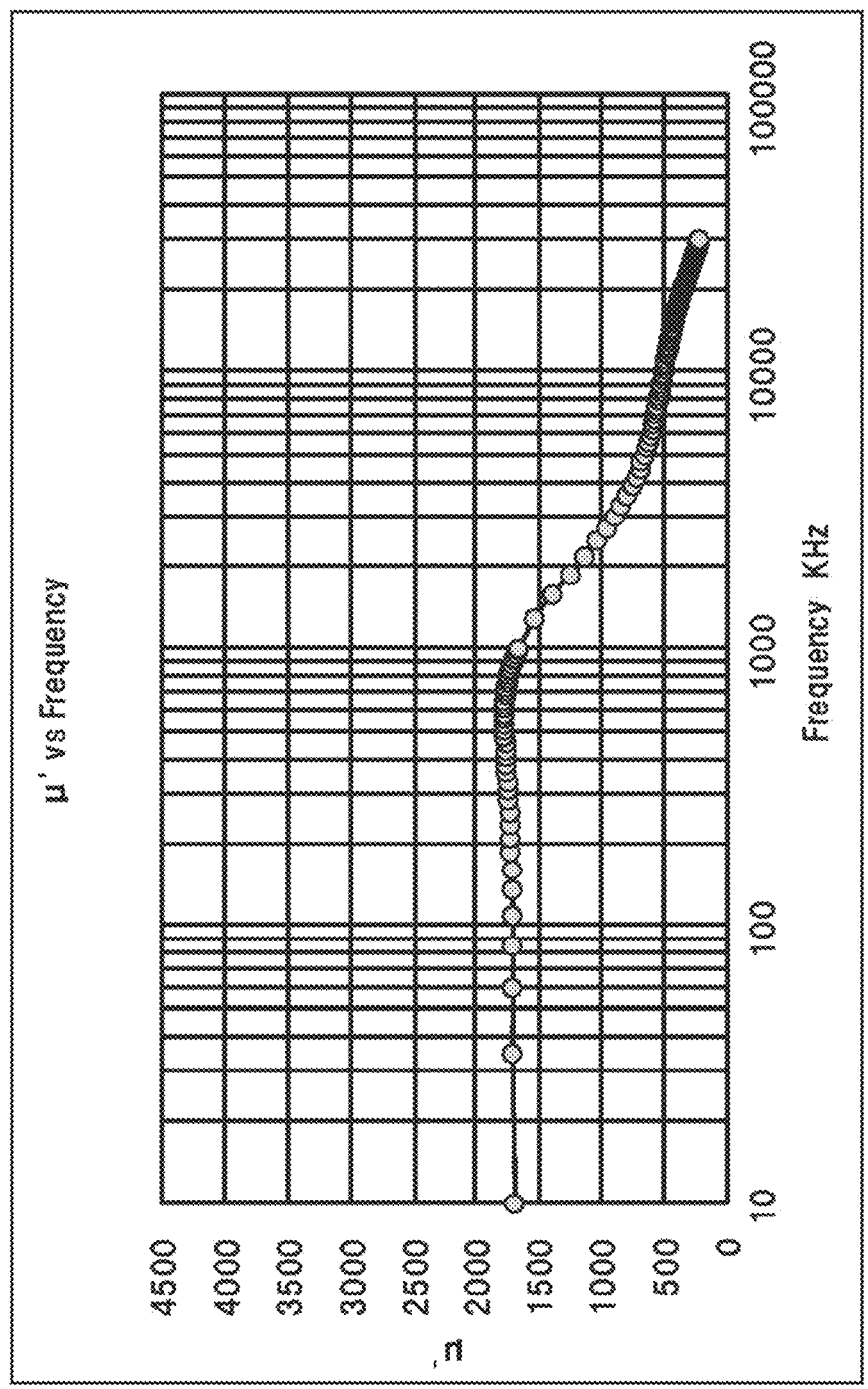
FIGS. 10A to 10C illustrate a frequency characteristic of a first magnetic sheet and a second magnetic sheet according to a first embodiment.
Figure 10B:
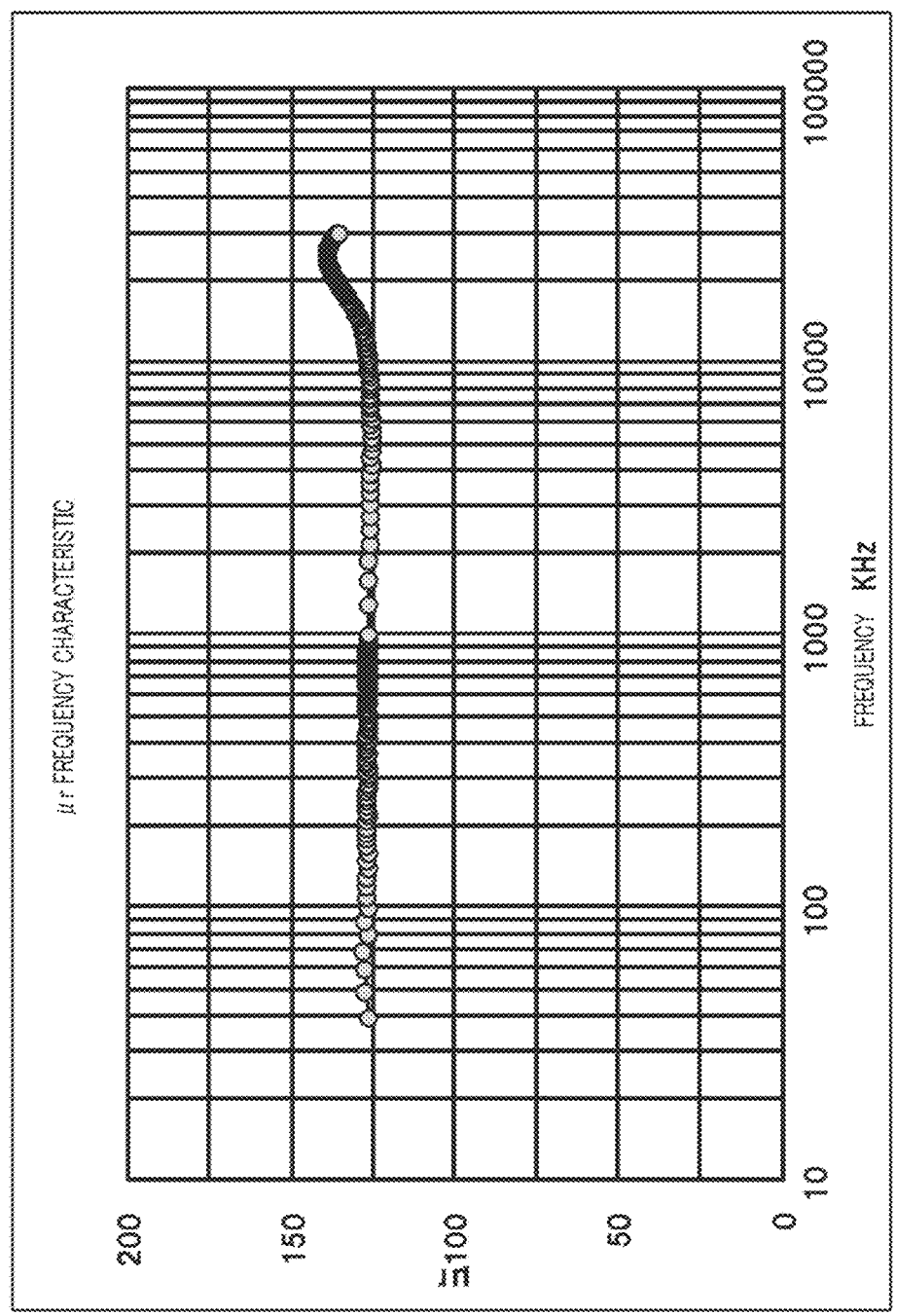
Figure 10C:
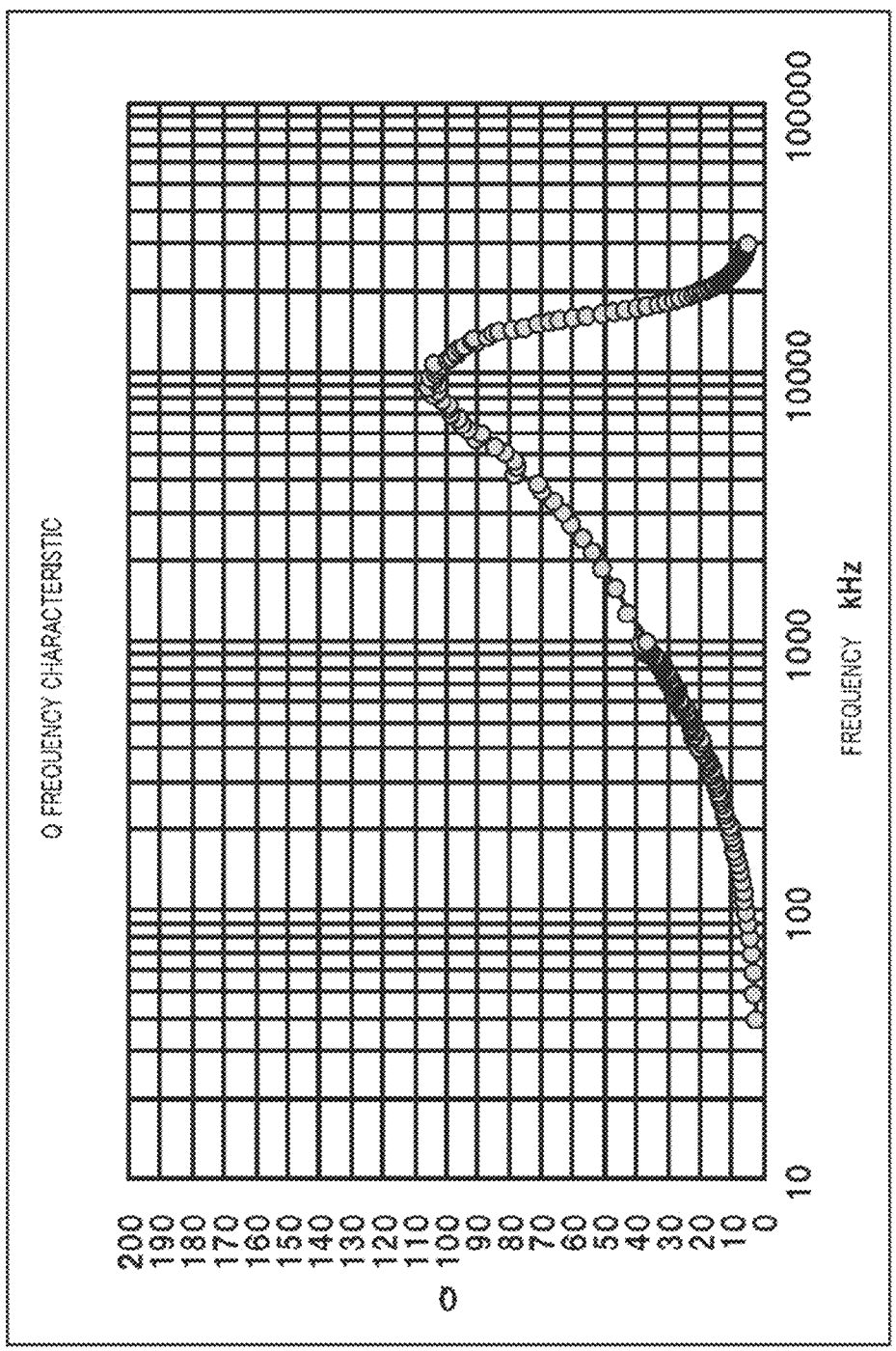

Next, the frequency characteristics of the first magnetic sheet and the second magnetic sheet will be described. The term "frequency" refers to the frequency of an antenna (for example, charging coil 41 or NFC coil 43) that includes the magnetic sheet. FIGS. 10A to 10C illustrate frequency characteristics of the first magnetic sheet and the second magnetic sheet according to the present embodiment. FIG. 10A illustrates a frequency characteristic of the magnetic permeability of first magnetic sheet 44 (Mn—Zn ferrite sintered body). FIG. 10B illustrates a frequency characteristic of the magnetic permeability of second magnetic sheet 45 (Ni—Zn ferrite sintered body). FIG. 10C illustrates a frequency characteristic of a Q value of second magnetic sheet 45.

In the present embodiment, as shown in FIG. 8C, second magnetic sheet 45 is stacked on the upper face of first magnetic sheet 44. As shown in FIG. 10A to 10C, second magnetic sheet 45 has favorable characteristics (a high Q value and a magnetic permeability of around 125) at a high frequency (13.56 MHz) that is used for communication by NFC coil 43, whereas first magnetic sheet 44 has a favorable characteristic (magnetic permeability of around 1,700) at a low frequency (100 to 200 kHz) that is used for power transmission by charging coil 41. Therefore, normally, the communication efficiency of NFC coil 43 will be improved by forming only second magnetic sheet 45 in a thick manner directly below NFC coil 43. However, in the present embodiment, first magnetic sheet 44 is extended as far as the area directly below NFC coil 43 to improve the power transmission efficiency of charging coil 41. This is because of the frequency characteristics of the respective ferrite sheets. First, first magnetic sheet 44 that is used for non-contact charging of a large amount of transmitted power is generally a high-magnetic permeability material for ensuring sufficient power transmission efficiency. On the other hand, magnetic permeability of the level required for first magnetic sheet 44 is not necessary with respect to second magnetic sheet 45 for NFC communication that transmits a small amount of power. Therefore, first magnetic sheet 44 also has the magnetic permeability required for NFC communication in a communication frequency band for NFC communication. That is, the overall magnetic permeability of first magnetic sheet 44 that supports non-contact charging is high irrespective of the frequency in comparison to second magnetic sheet 45 that supports NFC communication. As shown in FIG. 10A, even when the frequency is around 13.56 MHz, magnetic permeability μ of first magnetic sheet 44 is about 500, and first magnetic sheet 44 can adequately function as a magnetic sheet. In particular, first magnetic sheet 44 in the present embodiment that is described above can adequately fulfill a role as a magnetic sheet. In contrast, as shown in FIG. 10B, when the frequency is between 100 kHz to 200 kHz, second magnetic sheet 45 does not have sufficient magnetic permeability for non-contact charging (magnetic permeability of around 125).

Therefore, in order to improve and maintain the communication efficiency of both charging coil 41 and NFC coil 43, it is favorable to adopt a configuration in which the region directly below NFC coil 43 is a stacked structure that includes first magnetic sheet 44 and second magnetic sheet 45. It is thereby possible to improve the communication efficiency of both coils. That is, by making first magnetic sheet a large size, the power transmission efficiency of non-contact charging is improved and NFC communication is also adequately supported. The reason that second magnetic sheet for NFC communication is also provided, and not just first magnetic sheet 44, is to improve the Q value of NFC communication by NFC coil 43. As shown in FIG. 10C, because second magnetic sheet 45 has a favorable Q value, the communication distance of the NFC communication can be increased.

Also, as shown in FIG. 8A to 8D, NFC coil 43 and the whole area of second magnetic sheet 45 are placed on first magnetic sheet 44. Thus, there is first magnetic sheet 44 is under the whole area of second magnetic sheet 45 and the communication efficiency of NEC coil 43 is improved. In this case, the outer shape of second magnetic sheet 45 is same size as or smaller size than first magnetic sheet 44.

Further, parts of NFC coil 43 and second magnetic sheet 45 are placed on first magnetic sheet 44, and the rest of NFC coil 43 and second magnetic sheet 45 may protrude outside the first magnetic sheet 44. The outer shape of second magnetic sheet 45 is larger than first magnetic sheet 44, or the center of the first magnetic sheet 44 and the center of the second magnetic sheet 45 may be misaligned. However, larger area of NFC coil 43 and second magnetic sheet 45 are preferable to be stacked on first magnetic sheet 44. Also, the center of the first magnetic sheet 44 and the center of the second magnetic sheet 45 are preferable to be aligned. However, when NFC coil 43 and second magnetic sheet 45 are too large to be placed on first magnetic sheet 44, a part of NFC coil 43 and second magnetic sheet 45 may protrude outside first magnetic sheet 44. Thus, the opening area of NFC coil 43 does not depend on the area of first magnetic sheet 44 and is large. As a result, the communication efficiency of NFC coil 43 is improved, and secondary-side non-contact charging module 20 may be downsized despite of the size of NFC coil 43 because first magnetic sheet does not need to be formed largely.

In addition, while the thickness of first magnetic sheet 44 is 0.43 mm, second magnetic sheet 45 is a relatively thin 0.1 mm, which is less than half the thickness of first magnetic sheet 44. The diameter of the conducting wire of second magnetic sheet 45 is thinner than that of charging coil 41 (about 0.2 mm to 1.0 mm).

Furthermore, it is sufficient that at least a part of second magnetic sheet 45 and NFC coil 43 are mounted on first magnetic sheet 44, and it is not necessary to mount all of second magnetic sheet 45 and NFC coil 43 thereon. On the other hand, it is better for all of NFC coil 43 to be mounted on second magnetic sheet 45. It is thereby possible to improve the communication efficiency of NFC coil 43. However, it is favorable to make the opening area of NFC coil 43 large to improve the communication efficiency of NFC coil 43, and in such case an effect can be obtained by enlarging only second magnetic sheet 45 and NFC coil 43.

Next, design of the inside of secondary-side non-contact charging module 20 is described.

As described in FIGS. 2A and 2B, secondary-side non-contact charging module 20 is arranged at position 11B in housing 11 and does not overlap with camera unit 16 in a plane normal to the thickness direction of housing 11 (the direction of arrow A).

Further, secondary-side non-contact charging module 20 is arranged within a dimension L1 of the camera unit 16 along the thickness direction of the housing 11.

Furthermore, secondary-side non-contact charging module 20 is arranged at position 11B in housing 11 and does not overlap with battery pack 18 in a plane normal to the thickness direction of housing 11 (the direction of arrow A). And, secondary-side non-contact charging module 20 is arranged within a dimension L2 of the battery pack 18 in a plane normal to the thickness direction of housing 11 (the direction of arrow A).

Thus, secondary-side non-contact charging module 20 is arranged at position 11B in housing 11 and does not overlap with camera unit 16 and battery pack 18. Also, secondary-side non-contact charging module 20 is arranged within the dimension L1 of the camera unit 16 and the dimension L2 of the battery pack 18 in a plane normal to the thickness direction of housing 11 (the direction of arrow A). Thus, the mobile terminal 10 may be downsized.

Further, secondary-side non-contact charging module 20 may be arranged closer to housing 11 because secondary-side non-contact charging module 20 is arranged at position 11B where secondary-side non-contact charging module 20 does not overlap with camera unit 16 and battery pack 18.

FIG. 3 describes a relation of mobile terminal 10 and charger 50 when mobile terminal 10 is brought close to charger 50 which includes primary-side non-contact charging module for power transmission. Secondary-side non-contact charging module 20 is arranged so that at least a part of secondary-side non-contact charging module 20 is within 2.5 mm from an outer wall surface adjacent to charger 50 of housing 11.

Figure 12:
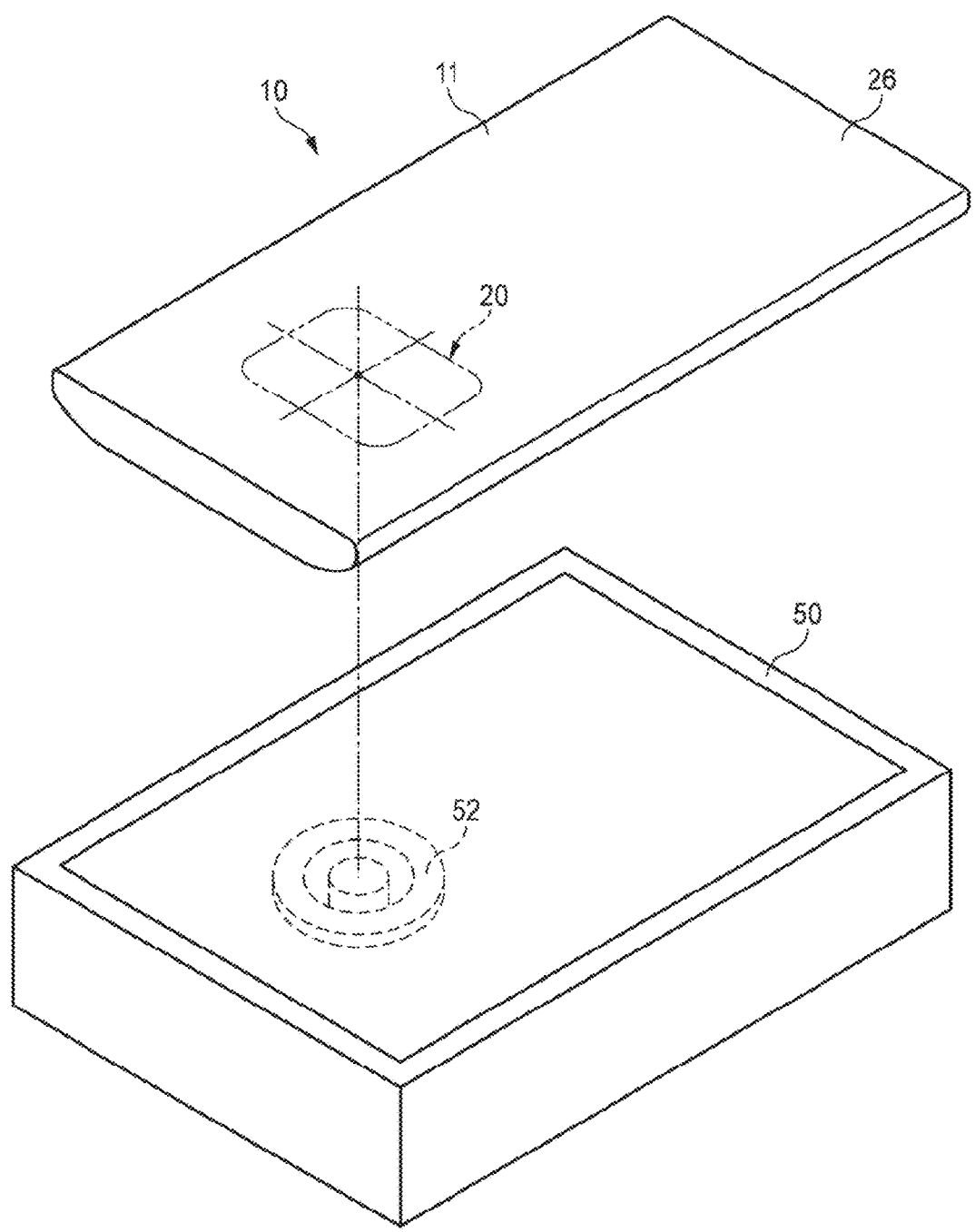
FIG. 12 is a perspective view illustrating an example of charging a secondary-side non-contact charging module according to a first embodiment.

Accordingly, as described in FIG. 12, primary-side non-contact charging module 52 of charger 50 and secondary-side non-contact charging module 20 of mobile terminal 10 may be arranged close to each other during power transmission. Thus, the power transmission efficiency between mobile terminal 10 and charger 50 may be improved. Further, the communication efficiency between mobile terminal 10 and charger 50 may be also improved.

Furthermore, as described in FIG. 2, secondary-side non-contact charging module 20 is arranged to overlap with a cross point 58 between a center line 55 extending in parallel to an interface between the first area 31 and the second area 32 and a center line 56, which extends orthogonal to the interface of the second area 32 and extends in a width direction of the housing 11.

The direction of the interface between the first area 31 and the second area 32 is same as a direction of an arrow C. Also, the width direction, which is orthogonal to the direction of the interface of the second area 32, of housing is same as a direction of an arrow B.

Battery pack 18 and secondary-side non-contact charging module 20 are arranged adjacent to each other by arranging battery pack 18 in the first area 31 of housing 11 and arranging secondary-side non-contact charging module 20 in the second area 32. Thus, connecting battery pack 18 to secondary-side non-contact charging module 20 may be easy.

Furthermore, secondary-side non-contact charging module 20 is arranged to overlap with the cross point 58 of a center line 55 extending in parallel to the interface between the first area 31 and the second area 32 (the direction of arrow C) and a center line 56 of the width direction (the direction of arrow B) of housing 11.

This may avoid weight imbalance of secondary-side non-contact charging module 20 in housing 11 and avoid causing discomfort to a user. Also, the user may charge the mobile terminal by placing the side of the housing of the mobile terminal on the charger.

As described in FIG. 3, heat dissipating sheet 22 is provided on first magnetic sheet 33 arranged on a side the secondary-side non-contact charging module 20 facing the circuit board 14.

The heat dissipating sheet 22 is provided on first magnetic sheet 33 (i.e. secondary-side non-contact charging module 20) and is in contact with the shield case 36. Thus, the heat of secondary-side non-contact charging and base substrate 34 (circuit board 14) module 20 may be dissipated easily.

Figure 13:
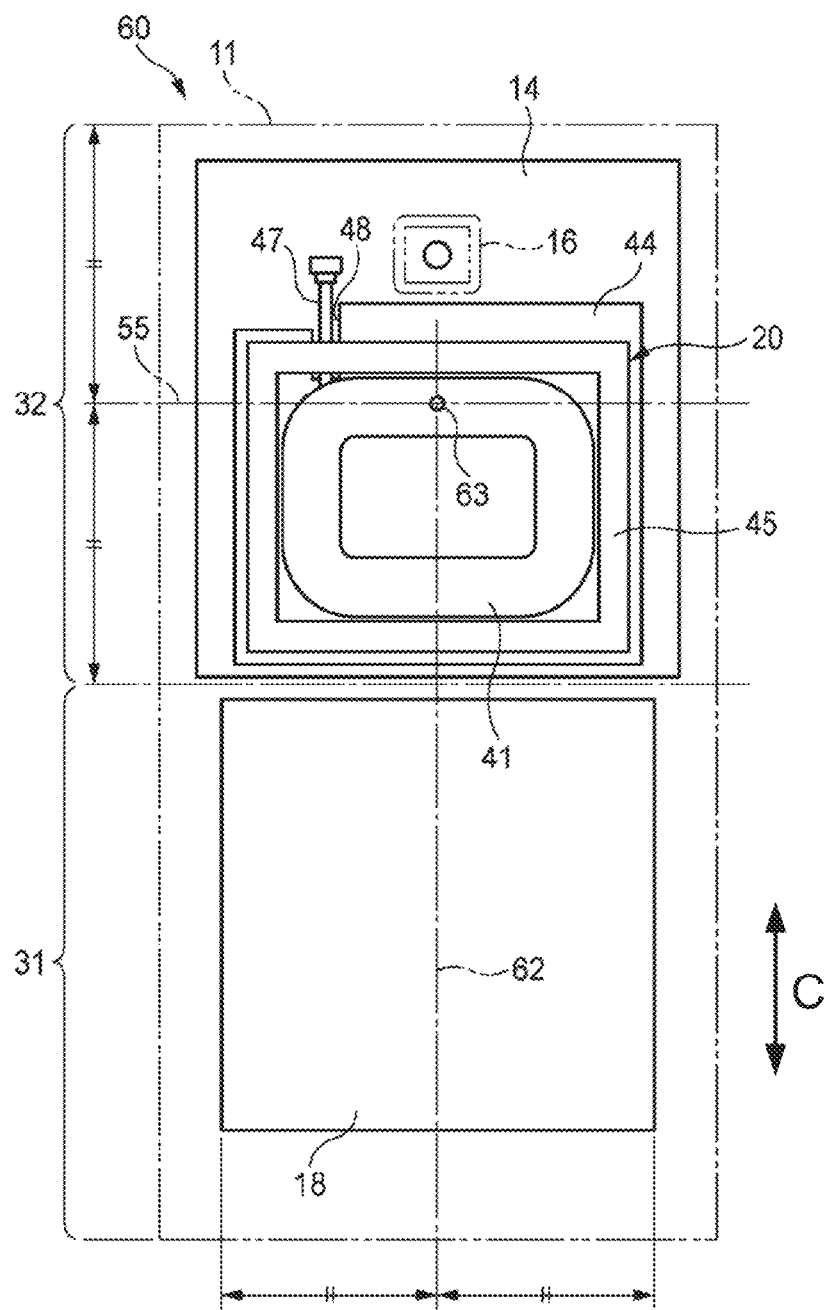
FIG. 13 is a plane view of a mobile terminal according to a second embodiment.
Figure 14:
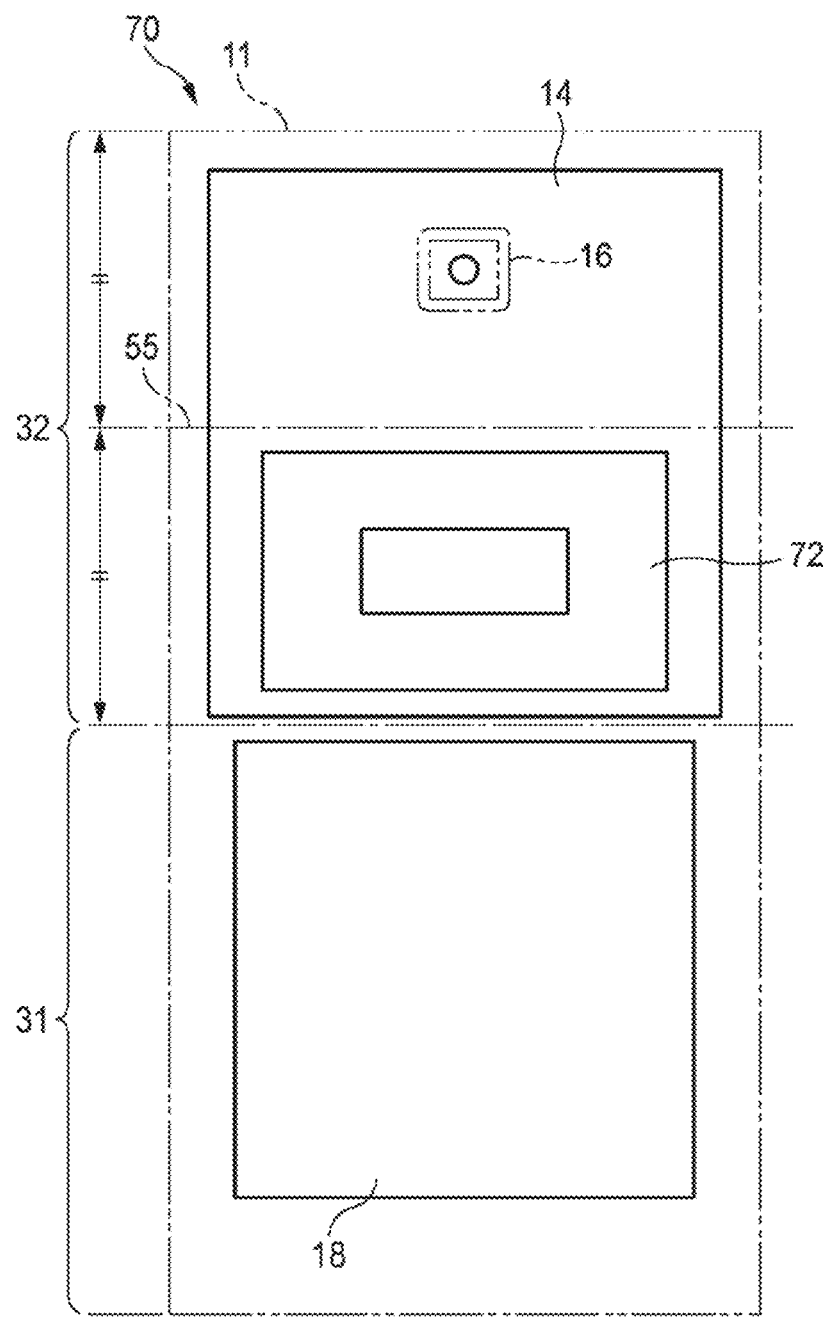
FIG. 14 is a plane view of a mobile terminal according to a third embodiment.

Next explanation is about the second embodiment and the third embodiment according to FIGS. 13 and 14.

In the second embodiment and the third embodiment, same parts as mobile terminal of the first embodiment are assigned same number as the first embodiment and not explained.

The Second Embodiment

As shown in FIG. 13, secondary-side non-contact charging module 20 is arranged to overlap with a cross point 63 between the center line 55 of the second area 32 and a center line 62 (the direction of arrow B) which extends orthogonal to the interface and extends in a width direction of the battery pack 18.

Other constitution of mobile terminal 60 is same as mobile terminal 10 of the first embodiment.

Arranging secondary-side non-contact charging module 20 to overlap with the cross point 63 between the center line 55 of the second area 32 and the center line 62 which extends in the width direction of the battery pack 18 may avoid weight imbalance caused by secondary-side non-contact charging module 20 in housing 11.

In particular, weight imbalance caused by secondary-side non-contact charging module 20 in the interface direction of battery pack 18 and causing discomfort to a user may be avoided. Also, the user may charge the mobile terminal by placing the side of the housing of the mobile terminal on the charger.

The Third Embodiment

As shown in FIG. 14, regarding mobile terminal 70 of the third embodiment, secondary-side non-contact charging module 72 is arranged on a side closer to the first area 31 relative to the center line 55 of the second area 32. Other constitution of mobile terminal 60 is same as mobile terminal 10 of the first embodiment.

Arranging secondary-side non-contact charging module 20 on a side closer to the first area 31 relative to the center line 55 of the second area 32 may avoid weight imbalance of secondary-side non-contact charging module 20.

In particular, weight of secondary-side non-contact charging module 20 is not biased to an opposite side of the first area 31 relative to the center line of the second area 32. Thus, causing discomfort to a user may be avoided. Also, the user may charge the mobile terminal by placing the side of the housing of the mobile terminal on the charger.

The Fourth Embodiment

In FIGS. 2A and 2B, secondary-side non-contact charging module 20 is arranged adjacent to camera unit 16. However, camera unit 16 may be arranged in a through hole which is formed in secondary-side non-contact charging module 20. Also, a part of NFC coil 43 may surround the though hole when the though hole is formed in secondary-side non-contact charging module 20.

In the above structure, NFC coil 43 has the wound wire which is large in length by use of a space around camera unit 16 and an antenna characteristic may be improved.

The mobile terminal of the present invention is not limited to the above embodiment and may be changed or improved appropriately.

For example, shapes and structures of the mobile terminal, the housing, the communicating hole, the circuit board, the camera unit, the primary-side non-contact charging module, the secondary-side non-contact charging module, the charging coil, the NFC coil, the first magnetic sheet, the second magnetic sheet, and the like are not limited to what is described and may be changed.

The present application claims priority from Japanese Patent Application No. 2012-145962 filed on Jun. 28, 2012, the contents of which are incorporated herein by reference.

INDUSTRIAL APPLICABILITY

The present invention is useful for various kinds of electronic devices such as a mobile terminal, in particular, portable devices such as a mobile phone, a portable audio device, a personal computer, a digital camera, and a video camera which include the non-contact charging module that includes a non-contact charging module and an NFC antenna.

REFERENCE SIGNS LIST 10, 60, 70 mobile terminal
11 housing
12 communicating hole
14 circuit board
16 camera unit
20, 72 secondary-side non-contact charging module (non-contact charging module)
22 heat dissipating sheet
41 charging coil
42 wire
43 NFC coil
44 first magnetic sheet
45 second magnetic sheet

The invention claimed is:

1. A mobile terminal comprising:
a housing;
a circuit board included in the housing and having a thickness direction normal to a plane of the circuit board;
a battery pack included in the housing; and
a non-contact charging module included in the housing, the non-contact charging module including:
a charging coil formed of a wound conducting wire;
a communication coil arranged adjacent to the charging coil; and
a magnetic sheet on which the charging coil and the communication coil are arranged, wherein the magnetic sheet has four edges that collectively define a rectangular profile of the magnetic sheet, and at most three pairs of adjacent edges respectively meet to form at most three corners;
wherein at least a portion of the non-contact charging module overlaps with the circuit board as viewed in the thickness direction of the circuit board.

2. The mobile terminal of claim 1, wherein the rectangular shape of the magnetic sheet has four corner portions of which at most three form the corners, each of four pairs of adjacent edges forms a virtual corner, a difference between each corner portion and its corresponding virtual corner defines a missing area, and the missing area of the corner portion that forms the corner is smaller than the missing area of the corner portion that does not form the corner.

3. The mobile terminal of claim 1, wherein the communication coil is a near field communication (NFC) coil.

4. The mobile terminal of claim 1, further comprising a camera,
wherein the charging coil is arranged closer to the battery pack than to the camera in a plane normal to the thickness direction of the circuit board.

5. The mobile terminal of claim 1, wherein the communication coil includes a conducting wire pattern-printed on a substrate.

6. A chargeable communication module comprising:
a wireless power charging coil;
a wireless communication coil electrically isolated from the wireless power charging coil; and
a magnetic sheet having four edges that collectively define a rectangular profile of the magnetic sheet, wherein at most three pairs or adjacent edges respectively meet to form at most three corners;
wherein,
the wireless power charging coil is disposed on a surface of the magnetic sheet,
the wireless communication coil is arranged adjacent to the wireless power charging coil, and
at least a portion of the wireless communication coil is disposed on the surface of the magnetic sheet.

7. The chargeable communication module of claim 6, wherein the rectangular shape of the magnetic sheet has four corner portions of which at most three form the corners, each of four pairs of adjacent edges forms a virtual corner, a difference between each corner portion and its corresponding virtual corner defines a missing area, and the missing area of the corner portion that forms the corner is smaller than the missing area of the corner portion that does not form the corner.

8. The chargeable communication module of claim 6, wherein the wireless communication coil includes a conducting wire pattern-printed on a substrate.

9. The chargeable communication module of claim 6, wherein the wireless communication coil is a near field communication (NFC) coil.

10. A mobile terminal comprising:
a housing;
a circuit board included in the housing and having a thickness direction normal to a plane of the circuit board;
a battery pack included in the housing; and
a non-contact charging module included in the housing, the non-contact charging module including:
  a charging coil formed of a wound conducting wire;
  a communication coil arranged adjacent to the charging coil; and
  a magnetic sheet on which the charging coil and the communication coil are arranged, wherein the magnetic sheet includes four sides that collectively define a rectangular profile of the magnetic sheet, the four sides consisting of a first side and a second side in parallel to each other, and a third side and a fourth side in parallel to each other, wherein the third side is interposed between the first side and the second side, the first side is longer than the second side, and the third side is longer than the fourth side;
wherein at least a portion of the non-contact charging module overlaps with the circuit board as viewed in the thickness direction of the circuit board.

11. The mobile terminal of claim 10, wherein the communication coil is a near field communication (NFC) coil.

12. The mobile terminal of claim 10, further comprising a camera,
wherein the charging coil is arranged closer to the battery pack than to the camera in a plane normal to the thickness direction of the circuit board.

13. The mobile terminal of claim 10, wherein the communication coil includes a conducting wire pattern-printed on a substrate.

14. A chargeable communication module comprising:
a wireless power charging coil;
a wireless communication coil electrically isolated from the wireless power charging coil; and
a magnetic sheet on which the charging coil and the communication coil are arranged, wherein the magnetic sheet includes four sides that collectively define a rectangular profile of the magnetic sheet, the four sides consisting of a first side and a second side in parallel to each other, and a third side and a fourth side in parallel to each other, wherein the third side is interposed between the first side and the second side, the first side is longer than the second side, and the third side is longer than the fourth side,
wherein,
the wireless power charging coil is disposed on a surface of the magnetic sheet,
the wireless communication coil is arranged adjacent to the wireless power charging coil, and
at least a portion of the wireless communication coil is disposed on the surface of the magnetic sheet.

15. The chargeable communication module of claim 14, wherein the wireless communication coil is a near field communication (NFC) coil.

16. The chargeable communication module of claim 14, wherein the wireless communication coil includes a conducting wire pattern-printed on a substrate.

* * * * *